(12) United States Patent
Sobecki

(10) Patent No.: US 12,503,891 B2
(45) Date of Patent: Dec. 23, 2025

(54) FLUSH DOOR HANDLE FOR VEHICLE

(71) Applicant: Magna Mirrors of America, Inc., Holland, MI (US)

(72) Inventor: Justin E. Sobecki, Rockford, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 251 days.

(21) Appl. No.: 18/336,078

(22) Filed: Jun. 16, 2023

(65) Prior Publication Data

US 2023/0340813 A1    Oct. 26, 2023

Related U.S. Application Data

(63) Continuation of application No. 16/587,103, filed on Sep. 30, 2019, now Pat. No. 11,680,432.

(60) Provisional application No. 62/788,978, filed on Jan. 7, 2019, provisional application No. 62/740,045, filed on Oct. 2, 2018.

(51) Int. Cl.
*E05B 85/10* (2014.01)

(52) U.S. Cl.
CPC ......... *E05B 85/107* (2013.01); *E05B 85/103* (2013.01); *E05Y 2900/531* (2013.01); *E05Y 2900/546* (2013.01)

(58) Field of Classification Search
CPC ....... E05B 85/10; E05B 85/103; E05B 85/107
See application file for complete search history.

(56) References Cited

U.S. PATENT DOCUMENTS

| | | | |
|---|---|---|---|
| 5,123,687 A | 6/1992 | Pfeiffer et al. | |
| 5,371,659 A | 12/1994 | Pastrick et al. | |
| 5,497,305 A | 3/1996 | Pastrick et al. | |
| 5,497,306 A | 3/1996 | Pastrick | |
| 5,669,699 A | 9/1997 | Pastrick et al. | |
| 5,671,996 A | 9/1997 | Bos et al. | |
| 5,786,772 A | 7/1998 | Schofield et al. | |
| 5,823,654 A | 10/1998 | Pastrick et al. | |
| 5,929,786 A | 7/1999 | Schofield et al. | |
| 5,938,321 A | 8/1999 | Bos et al. | |

(Continued)

FOREIGN PATENT DOCUMENTS

| | | |
|---|---|---|
| CN | 107503598 A | 12/2017 |
| CN | 108222714 A | 6/2018 |

(Continued)

*Primary Examiner* — Carlos Lugo
(74) *Attorney, Agent, or Firm* — HONIGMAN LLP

(57) ABSTRACT

A vehicular exterior door handle assembly includes a base portion and a handle portion having a base end and a swing end opposite the base end. The handle portion is movable relative to the base portion between a retracted position and a deployed position. An actuator includes a motor that is electrically operable in a deploying direction to move the handle portion toward the deployed position and is electrically operable in a retracting direction opposite the deploying direction. The motor operates in the deploying direction and imparts pivotal movement of a connecting link to move the handle portion toward the deployed position. With the handle portion at the deployed position, electrical operation of the motor of the actuator in the retracting direction imparts retracting movement of a reset element that engages a bellcrank and/or the connecting link to retract the handle portion toward the retracted position.

25 Claims, 39 Drawing Sheets

(56) References Cited

U.S. PATENT DOCUMENTS

| | | | |
|---|---|---|---|
| 6,086,229 | A | 7/2000 | Pastrick |
| 6,139,172 | A | 10/2000 | Bos et al. |
| 6,149,287 | A | 11/2000 | Pastrick et al. |
| 6,152,590 | A | 11/2000 | Furst et al. |
| 6,176,602 | B1 | 1/2001 | Pastrick et al. |
| 6,198,409 | B1 | 3/2001 | Schofield et al. |
| 6,227,689 | B1 | 5/2001 | Miller |
| 6,229,233 | B1 | 5/2001 | Torii et al. |
| 6,276,821 | B1 | 8/2001 | Pastrick et al. |
| 6,280,069 | B1 | 8/2001 | Pastrick et al. |
| 6,291,905 | B1 | 9/2001 | Drummond et al. |
| 6,349,450 | B1 | 2/2002 | Koops et al. |
| 6,390,264 | B2 | 5/2002 | Torii et al. |
| 6,396,408 | B2 | 5/2002 | Drummond et al. |
| 6,416,208 | B2 | 7/2002 | Pastrick et al. |
| 6,477,464 | B2 | 11/2002 | McCarthy et al. |
| 6,550,103 | B2 | 4/2003 | Koops et al. |
| 6,568,839 | B1 | 5/2003 | Pastrick et al. |
| 6,582,109 | B2 | 6/2003 | Miller |
| 6,907,643 | B2 | 6/2005 | Koops et al. |
| 6,977,619 | B2 | 12/2005 | March et al. |
| 7,407,203 | B2 | 8/2008 | Huizenga et al. |
| 7,492,281 | B2 | 2/2009 | Lynam et al. |
| 7,581,859 | B2 | 9/2009 | Lynam |
| 7,626,749 | B2 | 12/2009 | Baur et al. |
| 7,944,371 | B2 | 5/2011 | Foote et al. |
| 8,058,977 | B2 | 11/2011 | Lynam |
| 8,786,704 | B2 | 7/2014 | Foote et al. |
| 9,605,452 | B2 | 3/2017 | Yoshino et al. |
| 10,550,611 | B2 * | 2/2020 | Och ................... E05B 85/107 |
| 11,214,994 | B2 * | 1/2022 | Han ..................... E05B 81/90 |
| 11,536,058 | B2 * | 12/2022 | Han .................... E05B 85/103 |
| 11,680,432 | B2 | 6/2023 | Sobecki |
| 11,725,432 | B2 * | 8/2023 | Guerin ................ E05B 81/42 |
| | | | 70/208 |
| 2010/0007463 | A1 | 1/2010 | Dingman et al. |
| 2011/0148575 | A1 | 6/2011 | Sobecki et al. |
| 2016/0298366 | A1 | 10/2016 | Och |
| 2018/0106082 | A1 | 4/2018 | Brown et al. |
| 2020/0071973 | A1 * | 3/2020 | Han ..................... E05B 79/06 |
| 2023/0340813 | A1 * | 10/2023 | Sobecki .............. E05B 85/103 |

FOREIGN PATENT DOCUMENTS

| | | | | |
|---|---|---|---|---|
| CN | 108374615 A | * | 8/2018 | ........... E05B 85/107 |
| CN | 108547523 A | * | 9/2018 | ............ E05B 85/10 |
| CN | 108979368 A | * | 12/2018 | ............ E05B 77/06 |
| CN | 107503598 B | * | 7/2022 | ............ E05B 79/06 |
| CN | 108222714 B | * | 7/2023 | ............ E05B 79/14 |
| DE | 102016112689 A1 | * | 1/2018 | ............ E05B 81/76 |
| DE | 102017101418 A1 | * | 7/2018 | ............ E05B 81/90 |
| EP | 3396088 A1 | * | 10/2018 | ............ E05B 77/06 |
| GB | 2345437 A | * | 7/2000 | ............ E05B 81/28 |
| WO | WO-2008129003 A2 | * | 10/2008 | ........... E05B 85/107 |

* cited by examiner

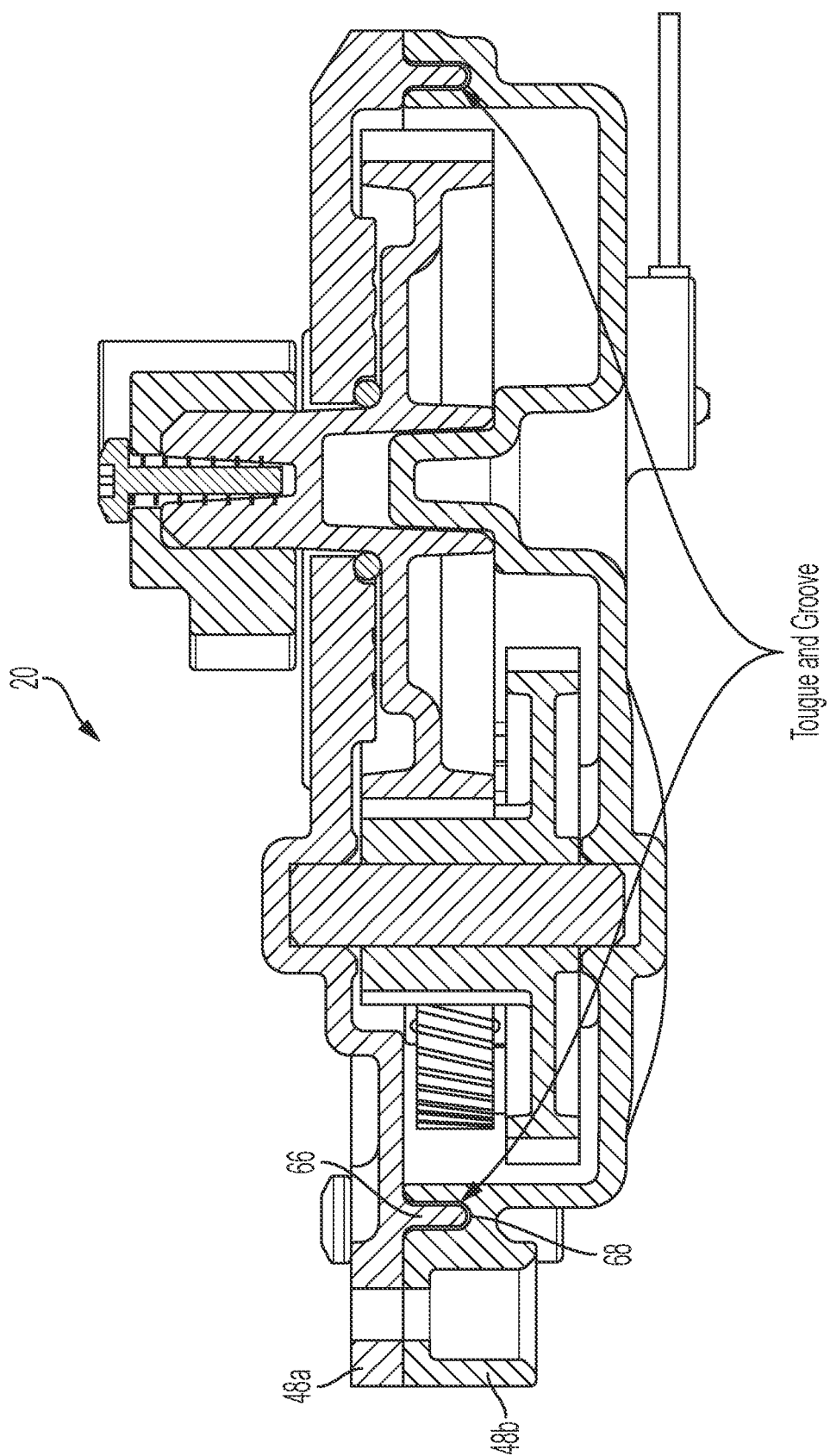

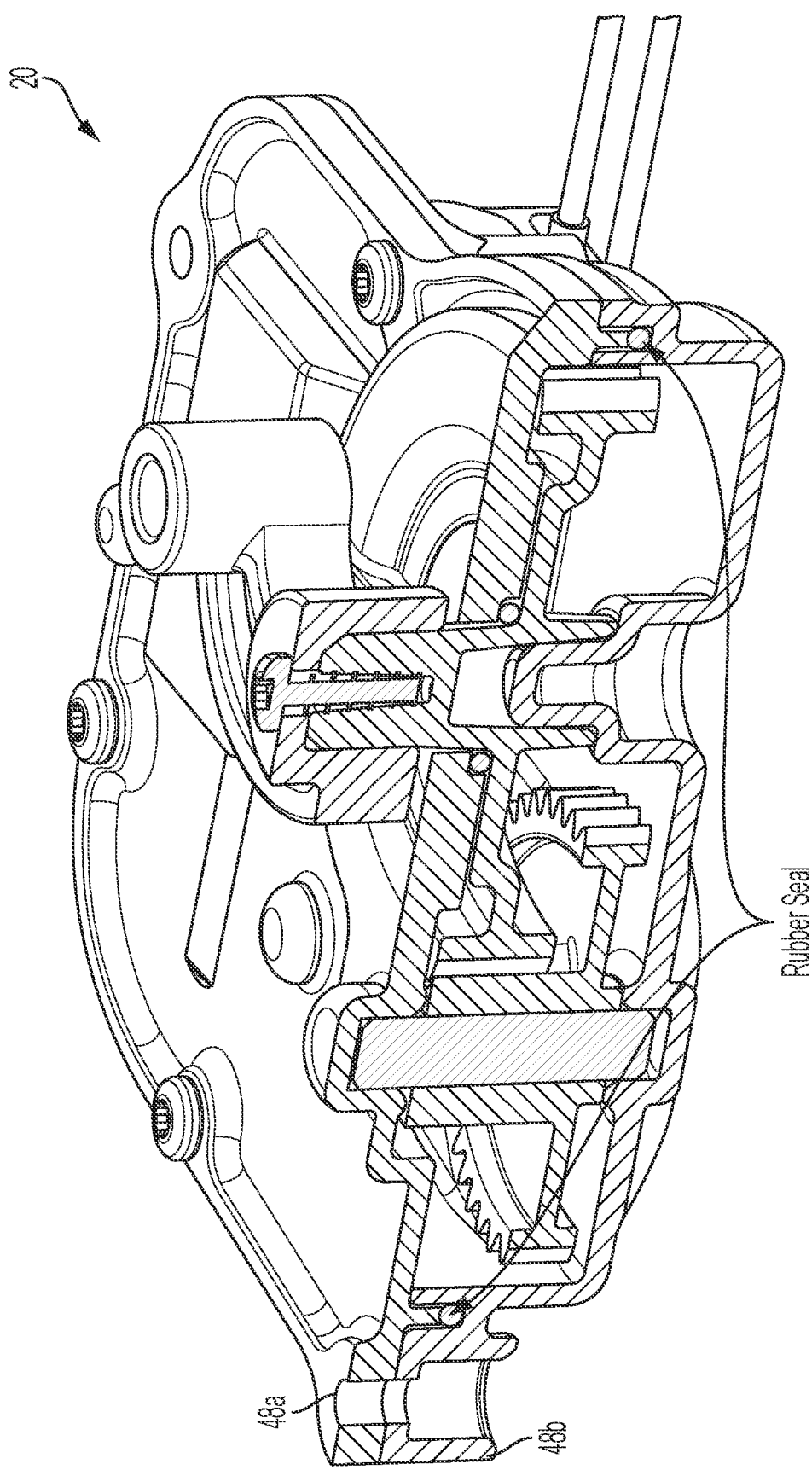

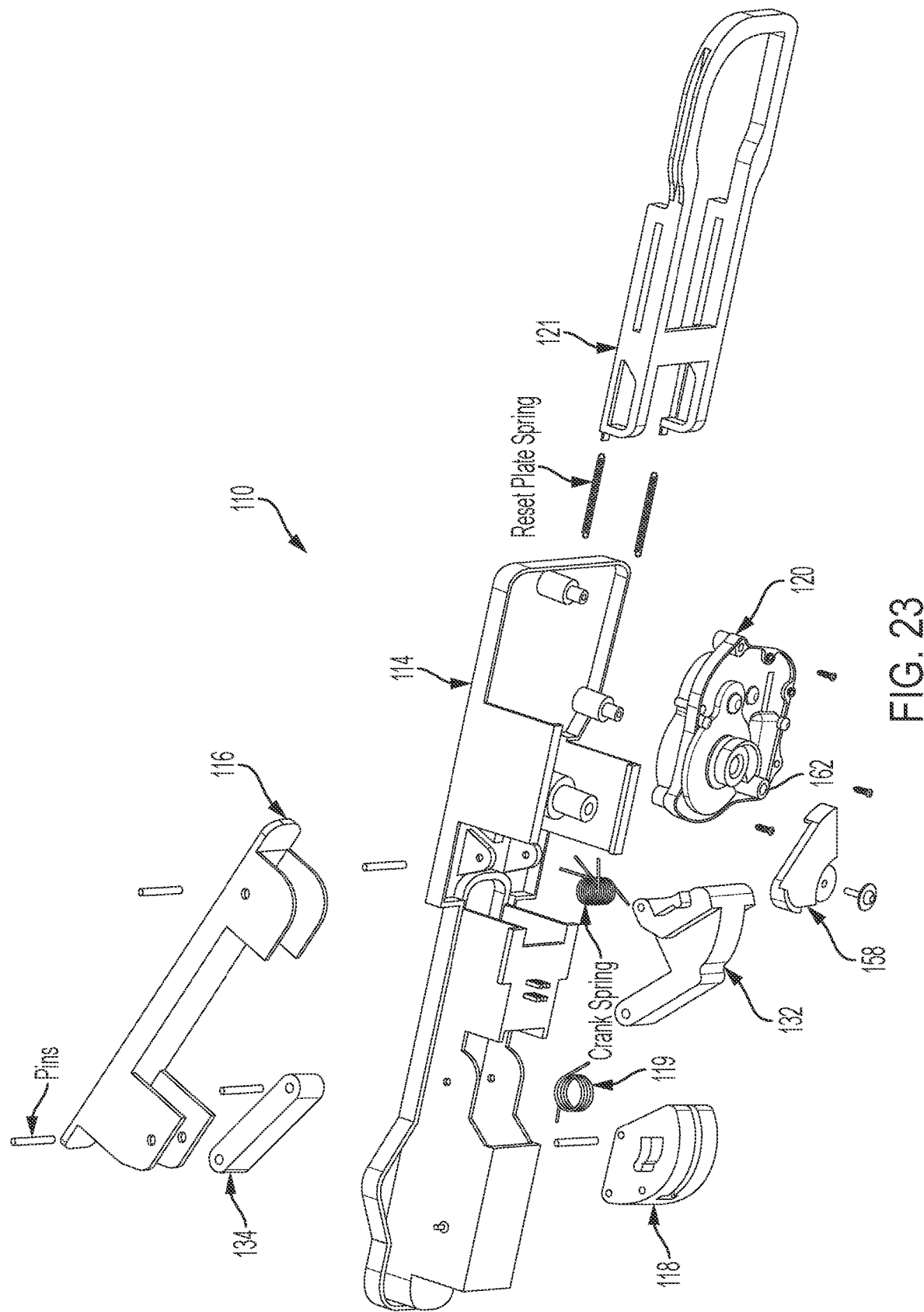

FLUSH DOOR HANDLE FOR VEHICLE

CROSS REFERENCE TO RELATED APPLICATIONS

The present application is a continuation of U.S. patent application Ser. No. 16/587,103, filed Sep. 30, 2019, now U.S. Pat. No. 11,680,432, which claims the filing benefits of U.S. provisional application Ser. No. 62/788,978, filed Jan. 7, 2019, and U.S. provisional application Ser. No. 62/740,045, filed Oct. 2, 2018, which are hereby incorporated herein by reference in their entireties.

FIELD OF THE INVENTION

The present invention relates to handles for vehicles and, more particularly, to an exterior handle for opening a side door and/or liftgate of a vehicle or interior handle for opening a side door and/or liftgate of a vehicle.

BACKGROUND OF THE INVENTION

A door handle for a vehicle door typically includes a handle portion that is pivotable relative to a base portion, whereby pivotal movement of the handle portion actuates a latch mechanism to open the door. Typically, a door handle is a pull strap handle with a strap handle portion that protrudes outwardly from the side of the vehicle for grasping by the person opening the door of the vehicle. Alternately, paddle type door handle assemblies are known, where a paddle portion is pivotally mounted to a base portion and is pulled generally outwardly and upwardly to open the vehicle door. Such paddle type door handle assemblies typically protrude outwardly from the vehicle door when in their unpulled state and have an open recess below the paddle portion for receiving a user's fingers for grasping the paddle portion.

SUMMARY OF THE INVENTION

The present invention provides an extendable flush door handle assembly for opening a door of a vehicle (such as a side door or rear door or liftgate of a vehicle) that includes a handle portion that is disposed at the door such that, when not in use to open the vehicle door, the handle portion is recessed at the door, with the outer surface of the handle portion generally flush with or generally coplanar with (or only slightly protruding from) the outer surface of the door panel at the door handle region of the door. The door handle assembly is operable to extend or move the handle portion outward from the door panel when a user is to use the handle to open the vehicle door, such as in response to a signal from a key fob or a passive entry system or the like. When so extended or moved to a deployed position, the handle may be readily grasped by the user and actuated or pulled or moved further outward to open the vehicle door. After the user releases the handle, the handle may return to its non-use or partially recessed position where its outer surface is generally flush or coplanar with (or only slightly protruding from) the outer surface of the door panel.

According to an aspect of the present invention, a handle assembly for a door of a vehicle comprises a base portion mounted at or incorporated into a structure of the door of the vehicle and a handle portion movable relative to the base portion. The handle portion is movable between an initial or non-use recessed position, where the handle portion is at least partially received in or recessed at the base portion, and a partially extended or ready or deployed position, where the handle portion protrudes partially outward from the base portion to be graspable by a user. The handle assembly further includes a connector with a first end and a second end. The connector is hingedly or pivotally connected at the first end to the base end of the handle portion. A crank or first connecting link pivotally connects the first end of the connector to the base portion and a follower or second connecting link pivotally connects the second end of the connector to the base portion. The handle assembly further includes an actuator with a motor that is electrically operable in response to a trigger or input signal. In response to the input signal, the motor operates and the actuator engages the crank to impart pivotal movement of the crank. The movement causes the crank and the follower to cooperatively pivot relative to the base portion and move the connector relative to the base portion and to move the handle portion between the recessed position and the deployed position. When the handle portion is at the deployed position, the swing end of the handle portion is manually movable further outward from the base portion to open the door of the vehicle.

According to another aspect of the present invention, a handle assembly for a door of a vehicle includes a base portion, a handle portion, a crank that pivotally connects the base end of the handle portion to the base portion, a bellcrank that is pivotally mounted at the base portion and that is coupled with a door latch of the door of the vehicle, and a bellcrank link that pivotally connects the swing end of the handle portion to the bellcrank. The actuator includes a motor that is electrically operable in response to a trigger or input signal. Responsive to the input signal, the motor operates and the actuator engages the crank to impart pivotal movement of the crank to cause the crank to pivot relative to the base portion and move the handle portion from the recessed position toward the deployed position. As the crank pivots to extend the base end of the handle portion, the bellcrank link pivots relative to bellcrank and the base portion to extend the swing end of the handle portion. When the handle portion is at the partially extended position, the swing end of the handle portion is manually movable further outward from the base portion to move the bellcrank link outward from the base portion to impart pivotal movement of the bellcrank relative to the base portion to open the door of the vehicle.

The present invention thus provides a door handle assembly that, when not in use, is in a recessed position, where an outer surface of the door handle portion is generally flush with the outer or exterior surface of the exterior panel of the vehicle door. The door handle portion cooperates with the door panel of the vehicle door to provide a generally flush, closed or uniform appearance of the door handle at the door when the door handle is not in use, with the door handle being movable or pivotable outward to a deployed position to facilitate grasping of the handle portion by a user when it is desired to open the vehicle door.

These and other objects, advantages, purposes and features of the present invention will become apparent upon review of the following specification in conjunction with the drawings.

BRIEF DESCRIPTION OF THE DRAWINGS

FIG. 17 is a cutaway plan view showing a tongue and groove arrangement for sealing an actuator;

FIG. 18 is a cutaway perspective view showing a rubber seal arrangement for sealing an actuator;

FIGS. 23 and 24 are exploded perspective views of another door handle assembly in accordance with the present invention;

DESCRIPTION OF THE PREFERRED EMBODIMENTS

Figure 1:
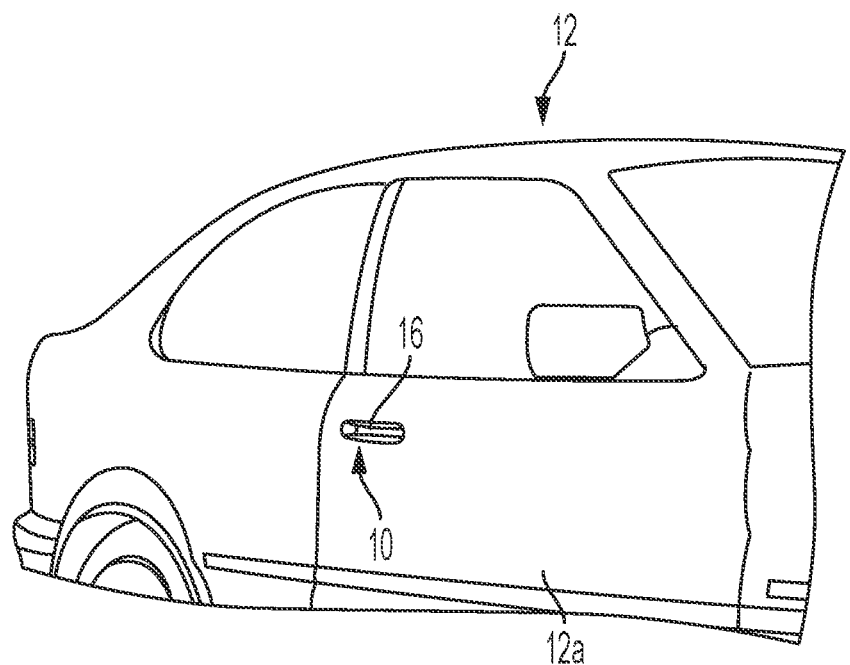
FIG. 1 is a perspective view of a vehicle with an extendable flush door handle assembly in accordance with the present invention.
Figure 2:
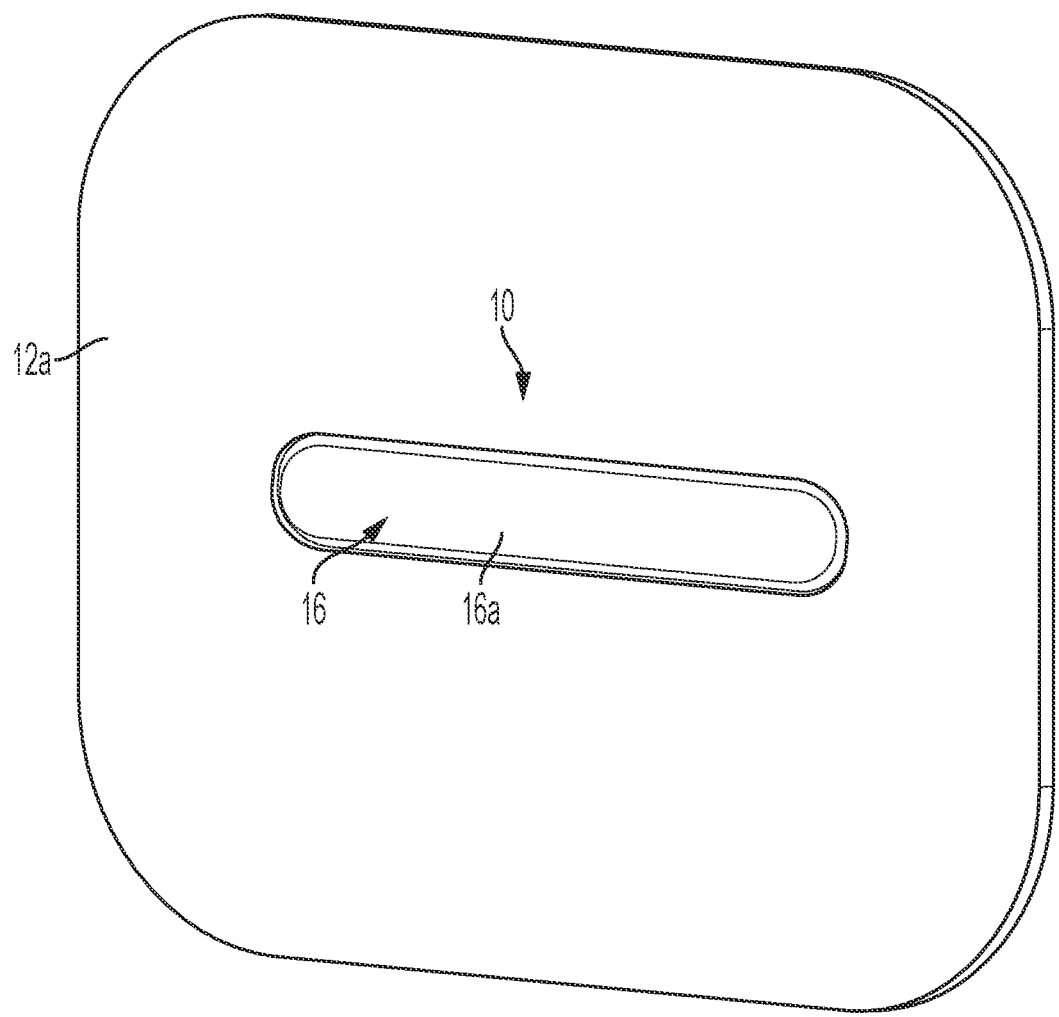
FIG. 2 is an enlarged perspective view of the extendable flush door handle assembly of FIG. 1 at the vehicle door, with the door handle in its flush or non-use or recessed position.
Figure 3:
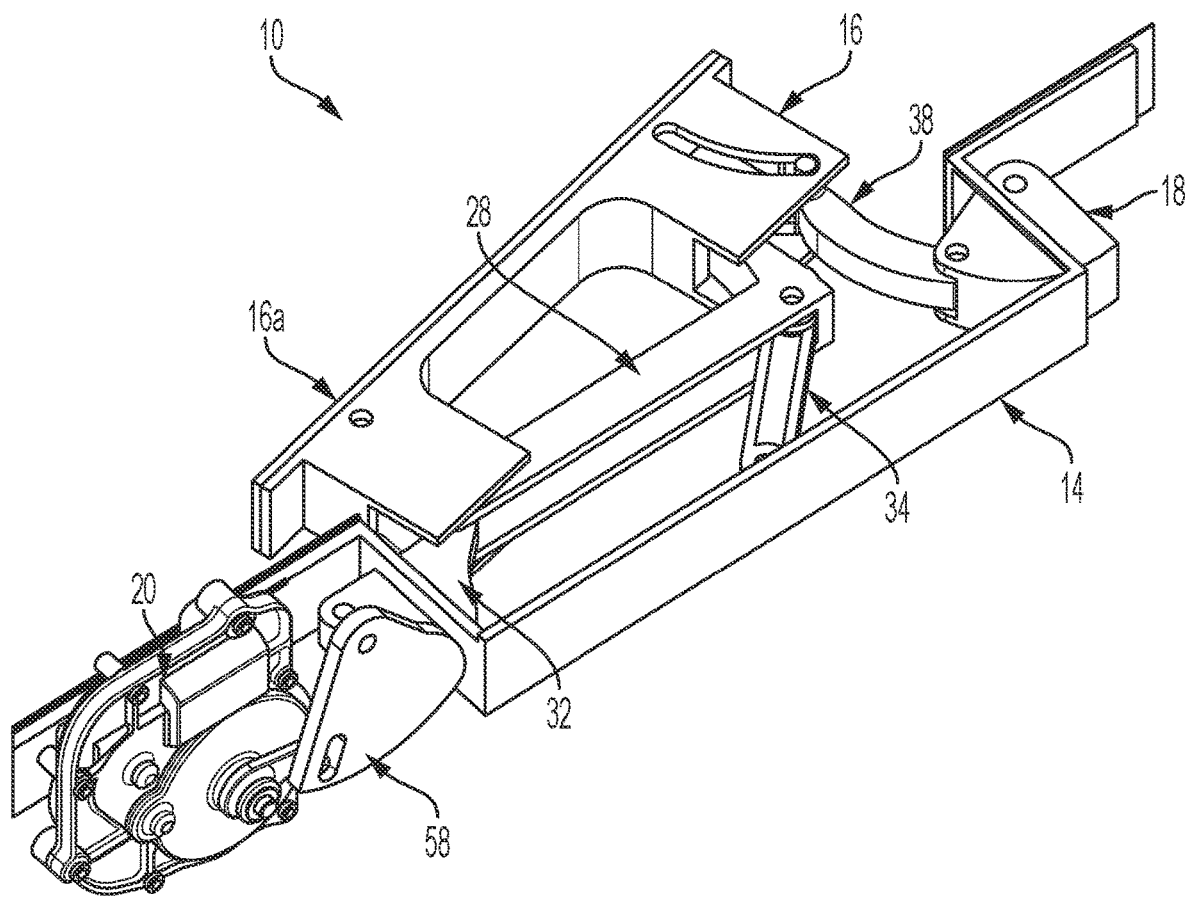
FIG. 3 is a perspective view of an extendable flush door handle assembly of the present invention.

Referring now to the drawings and the illustrative embodiments depicted therein, a vehicle handle assembly or module or unit or extendable flush door handle assembly 10 is mountable to a door 12a of a vehicle 12 and operable to release a latch mechanism of the vehicle door 12a to open the vehicle door (FIG. 1). Vehicle handle assembly 10 includes a base portion or bracket 14 that is mountable to a vehicle door and a handle or strap portion 16 that is pivotally mounted to bracket 14 (FIG. 3). When not in use, handle portion 16 is at an initial rest or recessed or non-use position and is received or disposed at or partially in base portion 14 so that an outer surface 16a of handle portion 16 is generally flush with or generally coplanar with (or protruding only slightly from or recessed slightly from) the outer surface 14a of the base portion 14 or the door panel, whereby handle portion 16 is not readily usable by a user (FIG. 2). Handle portion 16 is electromechanically pivotable or movable or laterally movable relative to the door and the base portion 14 to move to its ready or operational or grippable or graspable or person-operable position and is then graspable or grippable by a user and is manually moved (such as via pulling by the user) to actuate a bellcrank 18 at base portion 14, which in turn actuates or releases the latch mechanism of the door to open the vehicle door. Handle assembly 10 includes an electrically operable or electromechanical actuator 20 at base portion 14 for imparting the lateral movement of handle portion 16 relative to base portion 14 (such as automatically imparting such handle movement in response to a signal from a key fob or a passive entry system or the like) so that handle portion 16 is automatically moved from its recessed position to its ready or graspable position where a user can grasp the handle portion to pull or move the handle portion for unlatching and/or opening the vehicle door and/or the like, as discussed below.

Handle assembly 10 may comprise any suitable type of handle assembly, and may include or incorporate aspects of the door handle assemblies described in U.S. Pat. Nos. 6,977,619; 7,407,203 and/or 8,222,492, which are hereby incorporated herein by reference in their entireties. Optionally, aspects of handle assembly 10 may be suitable for use with a liftgate handle assembly for a liftgate or tailgate of a vehicle, while remaining within the spirit and scope of the present invention.

Figure 6:
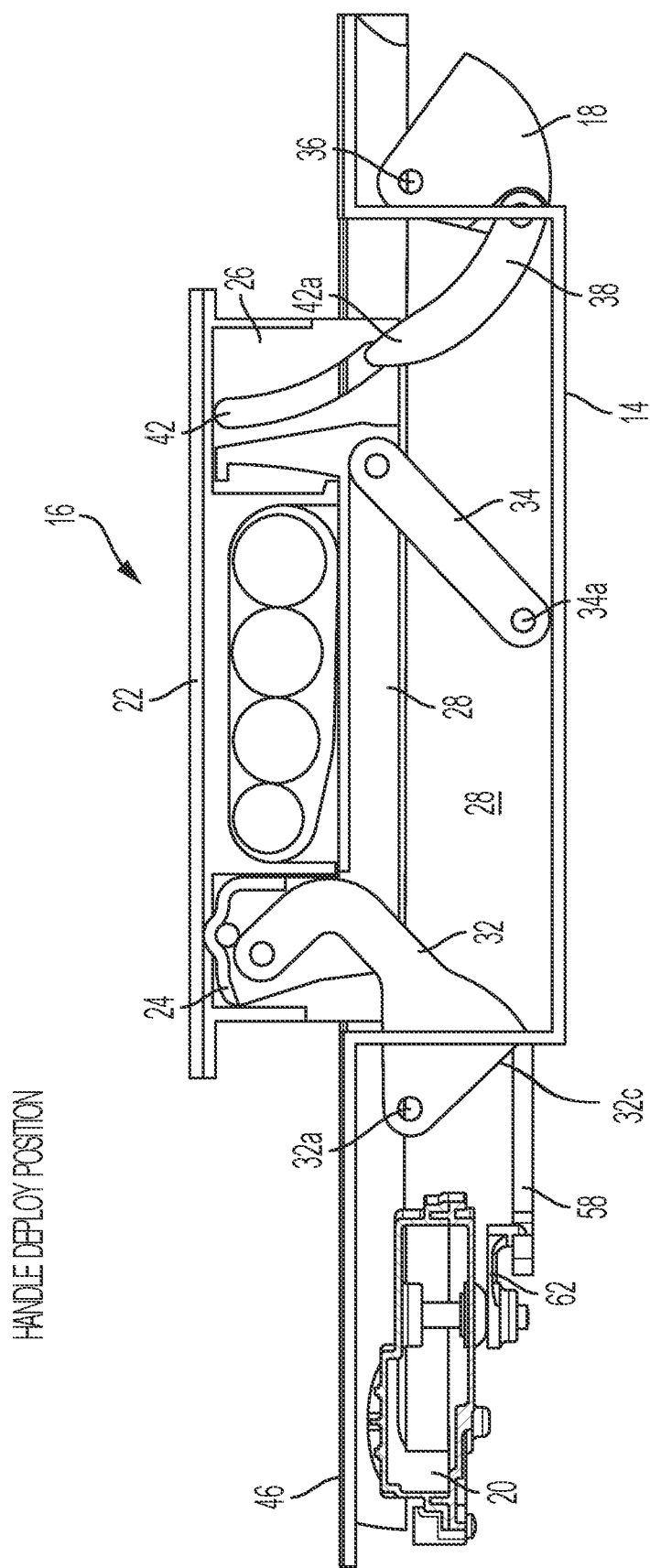
FIG. 6 is a top plan view of the extendable flush door handle assembly of the present invention, shown with the door handle moved to its use or deployed or ready or partially extended position.

In the illustrated embodiment, handle or strap portion 16 includes a grasping portion 22 for a user to grab and pull at to open the vehicle door. Handle portion 16 further includes a base end 24 and a swing end 26 at opposing ends of the grasping portion 22. The base end 24 of the handle portion 16 is hingedly connected to one end of a connector 28 at a pivot joint 30, such that when the handle portion 16 pivots, the swing end 26 of the handle portion moves away from the other end of the connector 28 and away from the base portion 14 and away from the vehicle to open the vehicle door. A crank or pivot arm or connecting link 32 pivotally couples the connector 28 to the base portion 14 at the base end of the handle portion via pivot joints 32a and 32b, and a follower or pivot arm or connecting link 34 pivotally couples the connector 28 at the swing end of the handle portion to the base portion 14 via pivot joints 34a and 34b. The pivot axis 30 of the base end of the handle portion at the connector 28 is offset or non-coaxial with the pivot axis 32b of the connecting link 32 at the connector 28. The connector 28 links or connects the crank 32 and the follower 34 together, such that movement of the crank 32 translates to movement of the connector which, in turn, translates to movement of the follower 34. The concerted movement of crank 32 and follower 34 moves the connector 28 and the handle portion 16 in and out relative to base portion 14, with the connector 28 remaining parallel to the base portion throughout its range of motion, and with the handle portion 16 also remaining parallel to the base portion when moved between the recessed position (FIG. 4) and the deployed position (FIG. 6). As can be seen with reference to FIGS. 4 and 6, the handle portion (and connector) moves or swings outward and in a direction toward the base end of the handle portion as it moves from the recessed position to the deployed position.

Figure 8:
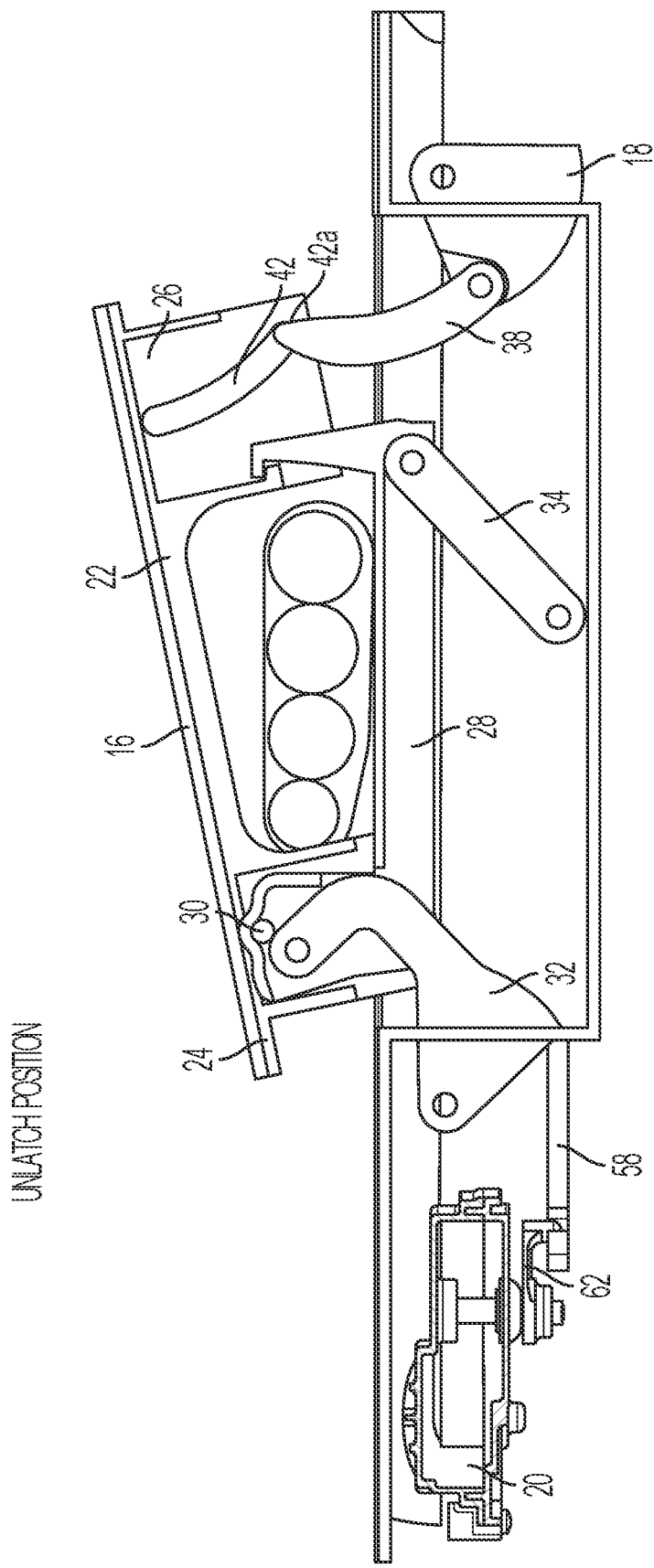
FIG. 8 is a top plan view of the extendable flush door handle assembly of the present invention, shown with the door handle pulled or moved to open the vehicle door.
Figure 9:
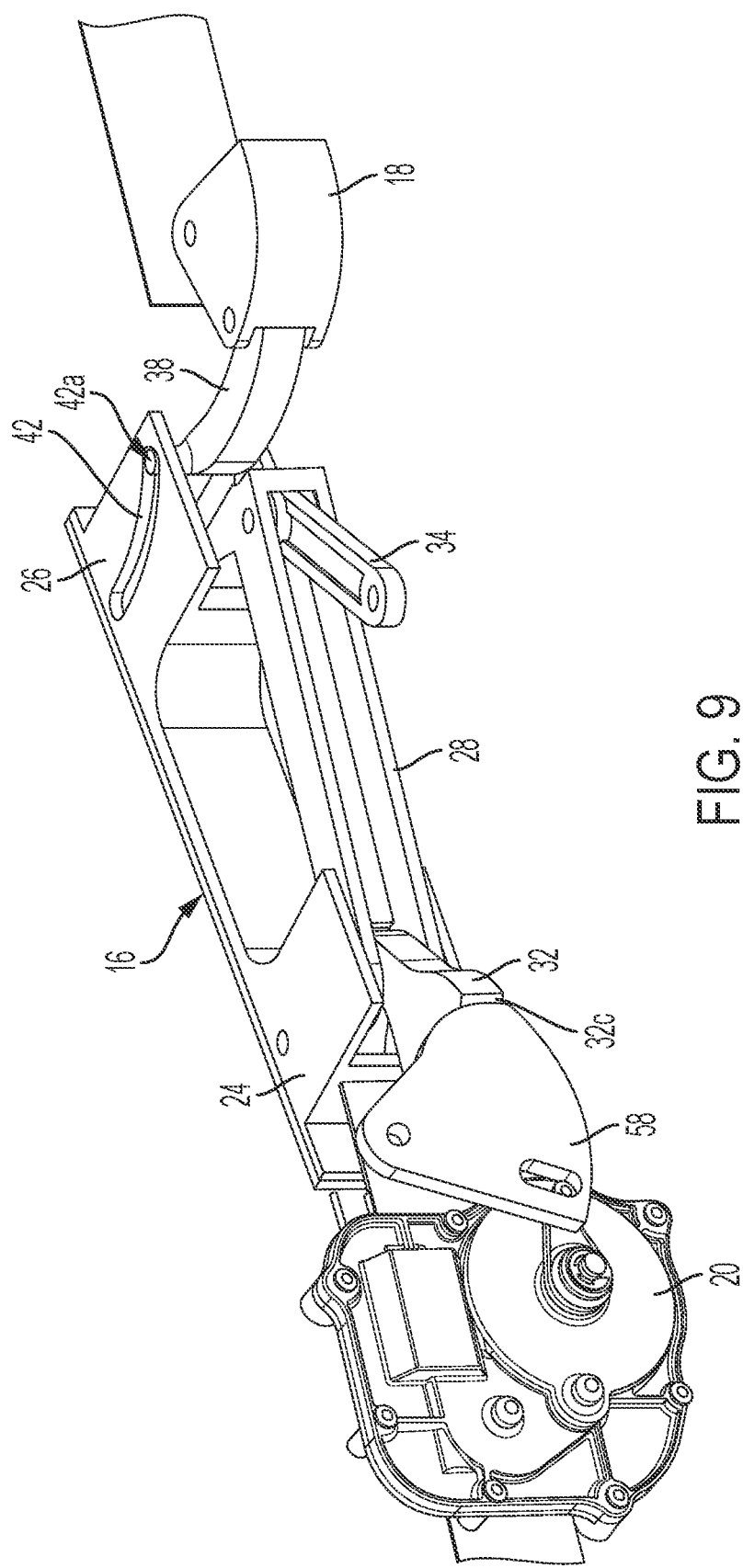
FIG. 9 is a perspective view of the extendable flush door handle assembly of the present invention, shown with the door handle pulled or moved to open the vehicle door.

Handle portion 16 is operatively coupled to the bellcrank 18 via a bellcrank link 38 that is pivotally attached at the bellcrank 18 and movably or slidably coupled at the swing end of the handle portion. When the swing end of the handle portion is pulled by a user outward away from the vehicle (compare FIGS. 6 and 8), the handle portion pivots and the swing end of the handle portion moves relative to the connector 28 (such as via sliding movement of the end of the connector within the swing end of the handle portion) further outward from the vehicle, pulling at the bellcrank link 38 and causing pivotal movement of the bellcrank 18 to disengage a door latch to allow the vehicle door to be opened. Bellcrank 18 is pivotally mounted to base portion 14 via a pivot element or joint or pin 36 and the bellcrank link 38 connects the swing end of the handle portion 16 to bellcrank 18. In the illustrated embodiment, one end of the bellcrank link 38 is pivotally attached to bellcrank 18 (such that pulling action by the bellcrank link imparts pivotal movement of the bellcrank about its pivot axis), while the other end of the bellcrank link 38 is slidably attached at the swing end of the handle portion via a pin 40 that extends from the other end of bellcrank link 38 is received in and is movable along an arcuate slot 42 at the swing end 26 of the handle portion. As can be seen with reference to FIGS. 6 and 8, a slot end 42a at an end of the slot 42 acts against pin 40 and pulls at bellcrank link 38 when the handle is pulled outward.

Figure 4:
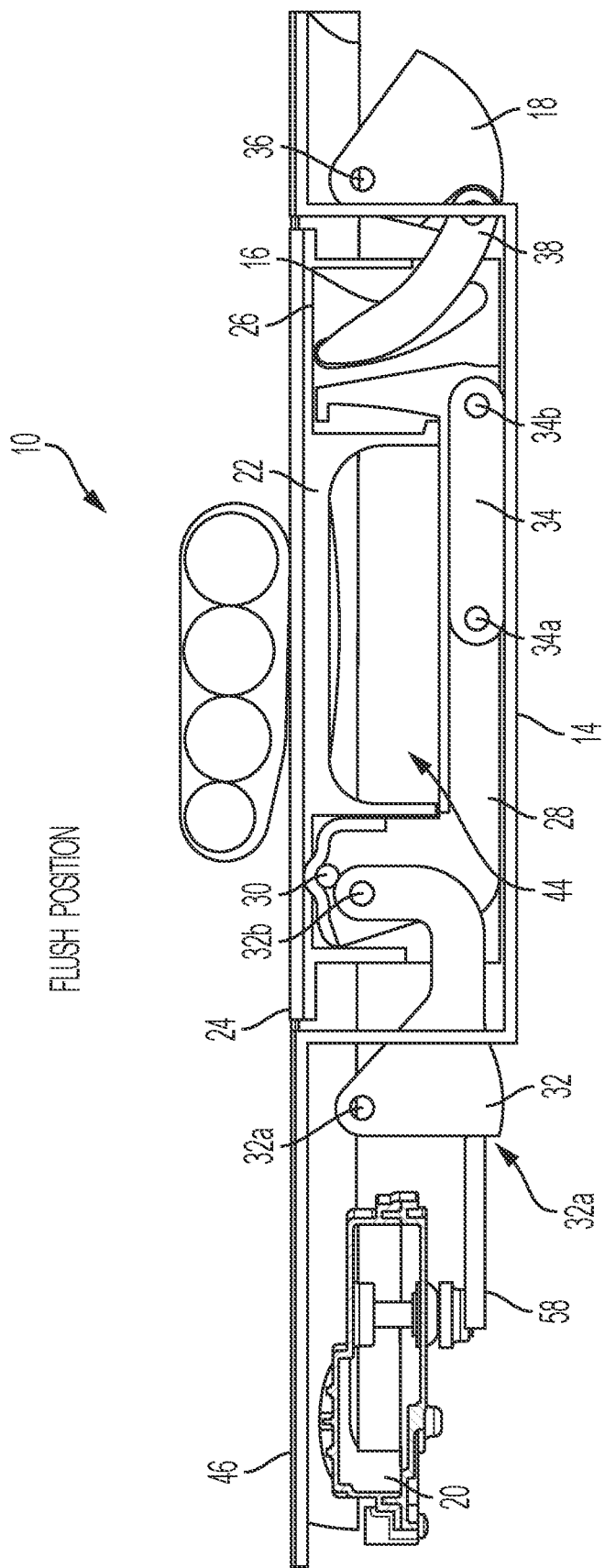
FIG. 4 is a top plan view of the extendable flush door handle assembly of the present invention, shown with the door handle in its flush or non-use or recessed position.
Figure 5:
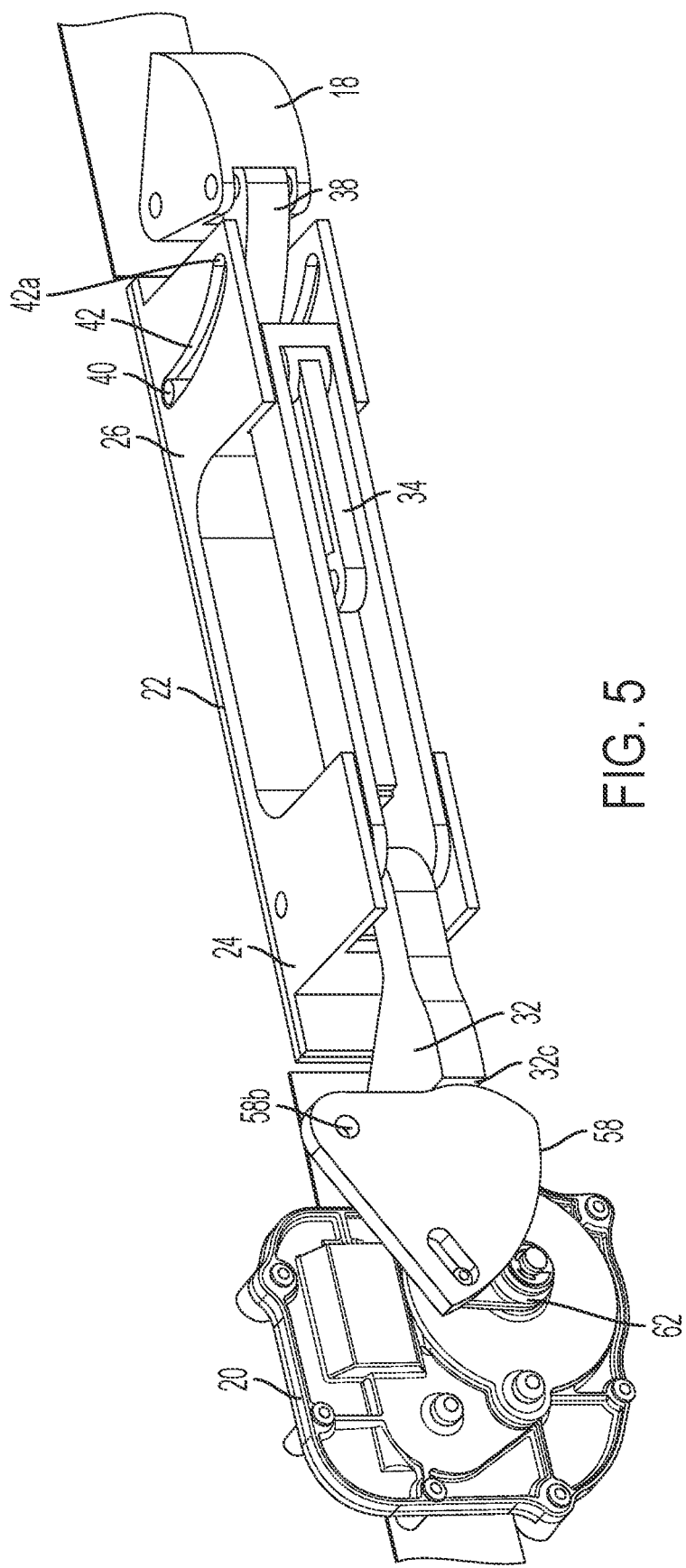
FIG. 5 is a perspective view of the extendable flush door handle assembly of the present invention, shown with the door handle in its flush or non-use or recessed position.

As can be seen with reference to FIGS. 4 and 6, when handle portion 16 is moved away from the vehicle from the flush position (FIG. 4) to the graspable (partially extended or deployed) position (FIG. 6), pin 40 of the bellcrank link 38 moves along the slot 42 until it contacts the slot end 42a. During this movement (achieved via the actuator to move the handle portion outward to the graspable or deployed position), the bellcrank link does not pull at the bellcrank and thus does not pivot the bellcrank, such that the door remains closed. When handle portion 16 is moved still further way from the vehicle to the door opening (unlatched) position (FIG. 8), the slot end 42a acts against pin 40 causing bellcrank link 38 to move, which, in turn, causes bellcrank 18 to pivot about the pivot joint 36 and to disengage the door latch. The bellcrank 18 is connected to the door latch, such as via a cable or other mechanical or electrical or electromechanical means (e.g., a cable may attach at an outer part of the bellcrank such that pivotal movement of the bellcrank pulls at the cable to actuate the door latch to allow the vehicle door to be opened). As handle portion 16 moves between the recessed (flushed) position (FIG. 4) and the partially extended or deployed position (FIG. 6), the slot end 42a does not act against pin 40, such that bellcrank 18 and bellcrank link 38 remain in their rest positions and the door latch remains engaged.

Base portion 14 includes handle receiving portion 44 for receiving handle portion 16 when handle portion 16 is in its non-use or flush or recessed position (FIG. 4), so that the handle rests or nests neatly in the base portion, with its outer surface generally flush with or protruding slightly from the vehicle door and with no pocket or recess around the handle that receives a user's hand when the handle is retracted or nested in the base portion (such as a hand receiving pocket formed or established below the handle for allowing a user to insert their hand into the pocket to grasp the handle when the handle is retracted). When partially extended to its graspable or use or deployed position, the handle extends a sufficient amount (such as to a desired or appropriate angle of extension or pivotal movement, and such as shown in FIG. 6) to provide sufficient clearance a person's hand to grasp the partially extended grasping portion of the handle. Preferably, for example, the electrically extendable flush handle can extend (to a selected dimension and/or angle and/or extent) sufficiently from the vehicle to allow, for example, a large hand and/or for a gloved hand in winter to grasp and operate the handle, with such degree of extension being otherwise unacceptable aesthetically and aerodynamically for non-extendable door handle paddle or strap assemblies.

The handle portion 16 is moved to the partially extended or deployed position via an actuator 20, which rotates an actuator arm 58, which has a cam surface 58a that engages a portion or driving surface 32c of the crank 32, to impart pivotal movement of the crank 32 to extend the connector 28 and the base end 24 of the handle portion 16. Because the connector also is at the swing end 26 of the handle portion, extension of the connector moves the swing end 26 outward as well, such that the handle portion 16 moves outward from the door while remaining generally parallel to the door surface at or around the door handle region where the door handle assembly is disposed (as shown in FIG. 6).

In the illustrated embodiment, the actuator 20 is attached or fastened or secured to a mounting portion 46 of base portion 14, such as via a plurality of fasteners (or the actuator may be otherwise formed or established at the base portion, such as via a snap connection or via integral forming of a housing of the actuator with the base portion or the like). As shown in FIGS. 12, 14A-B, and 15, actuator 20 comprises a housing or casing 48 that houses an actuator motor 50 that is operable to rotate an output shaft 50*a* in either direction, such as in response to an actuating trigger or signal.

The motor output shaft 50*a* is received in a worm gear or helical gear 50*b* that engages a gear member 52 that has a helical gear portion 52*a* for engaging helical gear 50*b* and a gear portion 52*b* (best seen in FIG. 14B) for engaging another gear element 54. Gear elements 52 and 54 are constrained or otherwise retained in housing 48 with pins 56*a* and 56*b*, respectively. Gear element 54 has a first portion 54*a* for engaging gear portion 52*b* and a second portion 54*b* for engaging an output gear 60. Output gear 60 has a gear portion 60*b* for engaging second portion 54*b* of gear element 54. Output gear 60 is rotatably mounted to housing 48 and has an engaging end or portion 60*a* that extends from housing 48 for engaging an output cam 62, which is coupled to the actuator arm 58, discussed below. Thus, when motor 50 is actuated to rotate output shaft 50*a*, the gear elements 52 and 54 and output gear 60 cooperate to impart a corresponding rotation of engaging end 60*a* and output cam 62 and pivoting of actuator arm 58 to extend the handle portion. The foregoing arrangement or gear train can be back driven to reverse handle movement.

Figure 16A:
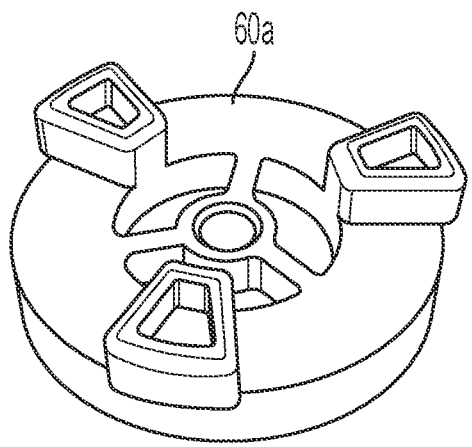
FIGS. 16A-C are views of an engaging end, a rubber coupler, and a output gear.
Figure 16B:
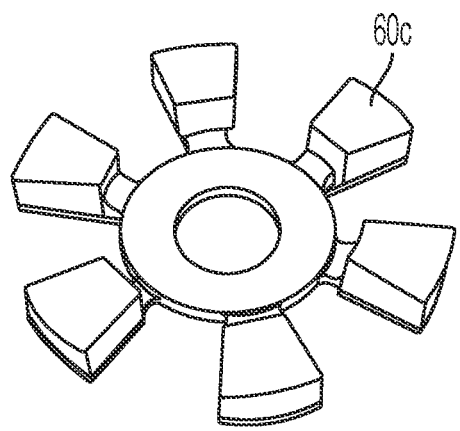
Figure 16C:
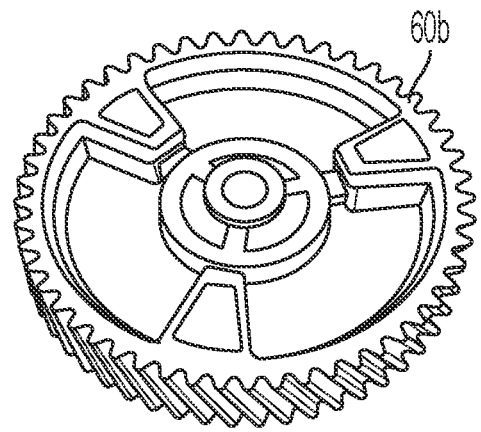

In examples of output gear 60 shown in FIGS. 12, 14A-B, and 15, engaging end 60*a* is a part of gear portion 60*b*. For some applications, in order to pass shock loads on actuator 20, engaging end 60*a* and gear portion 60*b* are separated (FIGS. 16A and 16C) and coupled together using an elastomeric or rubber coupler 60*c* (FIG. 16B). This arrangement allows engaging end 60*a* to be made from material that is harder or stiffer (less flexible) than gear portion 60*b*.

Figure 19:
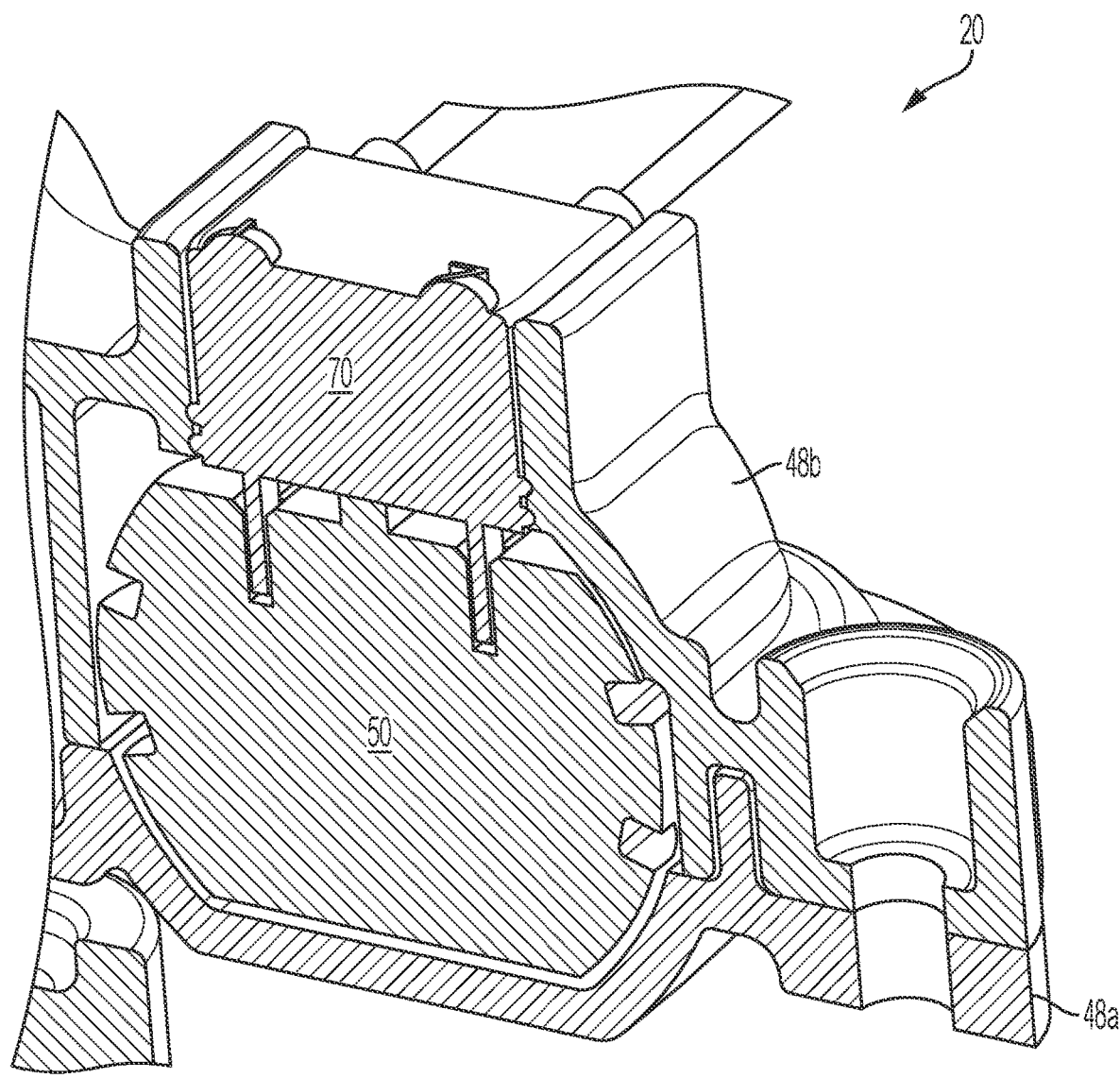
FIG. 19 is a cutaway perspective view showing a sealed electrical connection with an actuator motor.

In the illustrated example, the actuator housing 48 includes an upper housing 48*a* and a lower housing 48*b* fastened together with fasteners 64 to form a cavity to house the components described above. Examples of actuator 20 incorporate one or more features for inhibiting water, dirt, and/or other contaminants from entering into housing 48 and fouling the components. In the example shown in FIG. 17, housing 48 includes a tongue 66 extending from the perimeter of the upper housing 48*a* that mates with a corresponding groove 68 formed in the lower housing 48*b*. In the example shown in FIG. 18, housing 48 includes a rubber seal disposed between upper housing 48*a* and lower housing 48*b*. Other examples include a foamed-in-place gasket, custom molded gasket, and O-ring. In the example shown in FIG. 19, housing 48 includes an over molded electrical connector 70 that is sealed to lower housing 48*b* for providing electrical power to motor 50.

Figure 20:
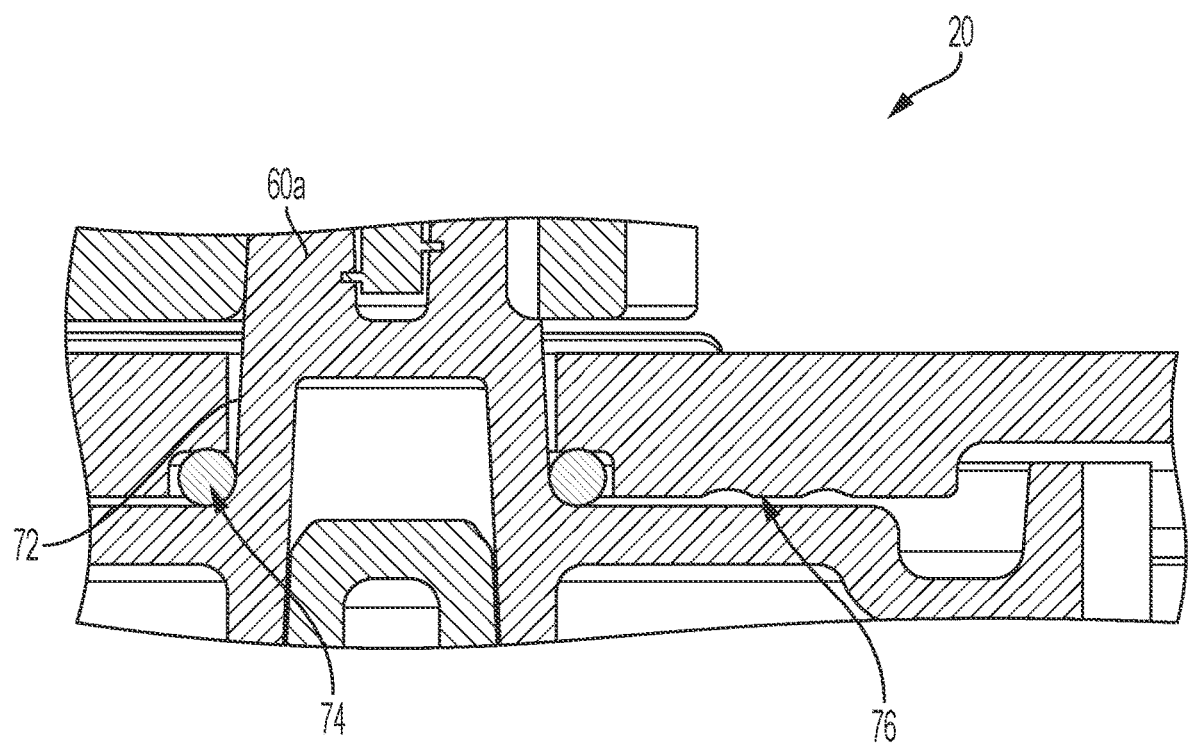
FIG. 20 is a cutaway plan view showing an arrangement for sealing an output element of an actuator.

In the example shown in FIG. 20, housing 48 has an aperture 72 formed therein through which engaging end 60*a* extends. An O-ring or gasket 74 is disposed about aperture 72 and seals the interior of housing 48 and the components inside from the elements while allowing engaging end 60*a* to rotate freely. Alternatively or in addition to O-ring 74, housing 48 may include a grease trap 76 formed in upper housing 48*a* thereby sealing the interior of housing 48 and the components inside from the elements while allowing engaging end 60*a* to rotate freely.

Figure 21A:
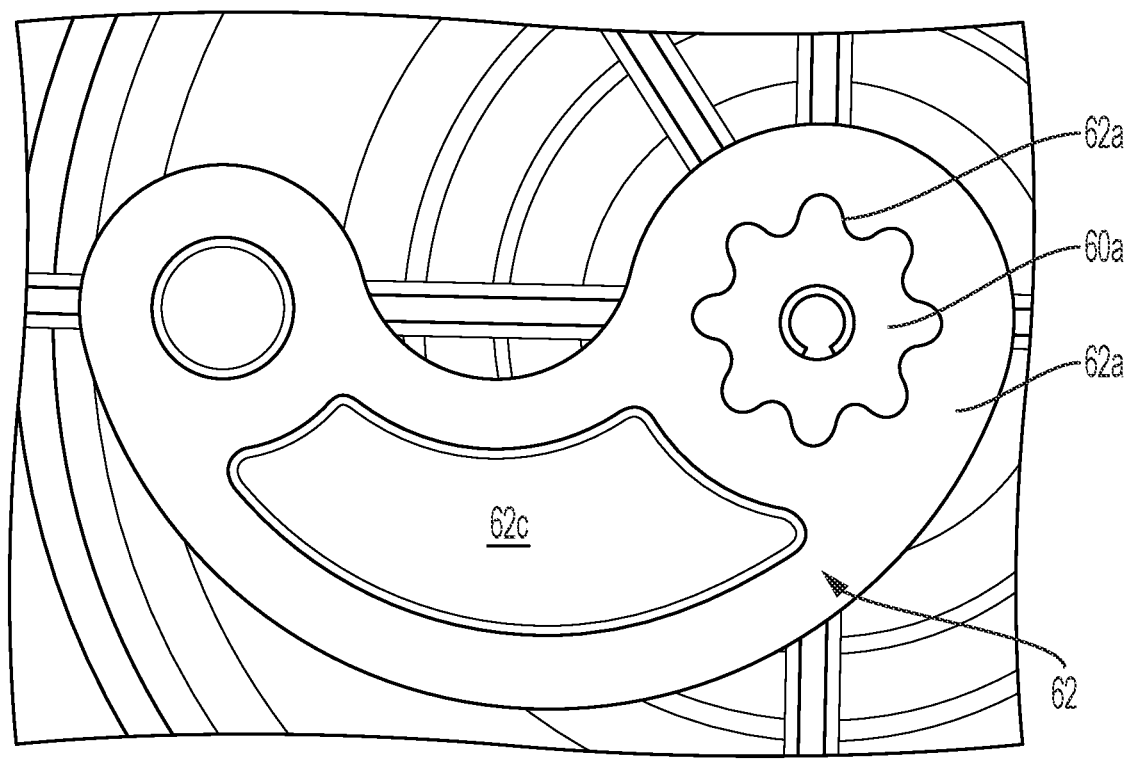
FIGS. 21A and 21B are views of an actuator output cam.
Figure 21B:
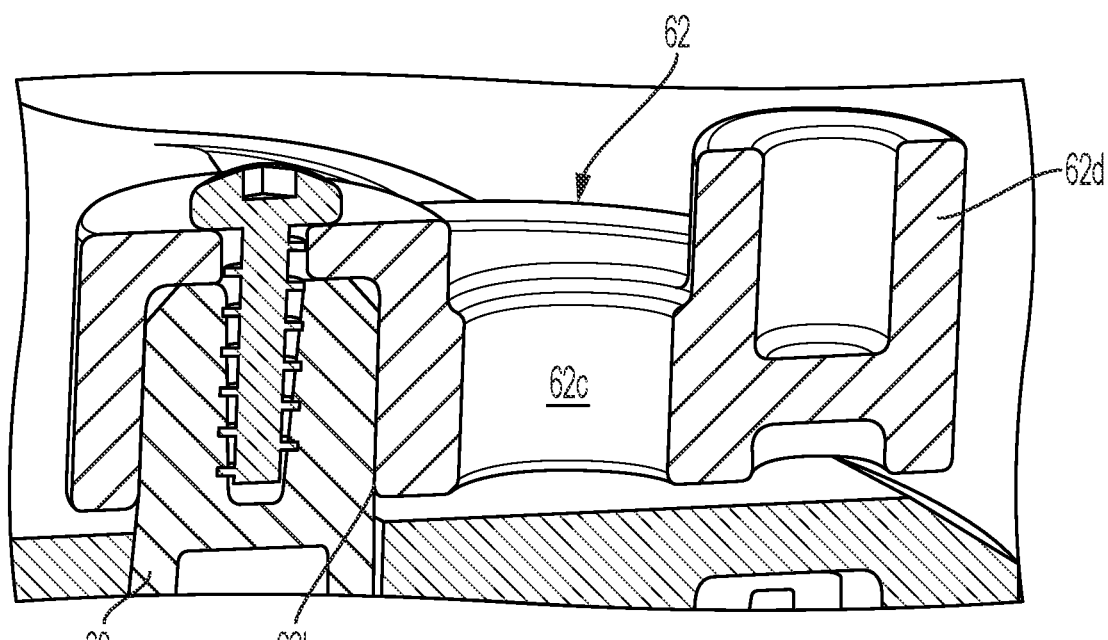

In the illustrated embodiment shown in FIGS. 21A and 21B, output cam 62 comprises a central portion 62*a* having an aperture 62*b* therethrough. Engaging end 60*a* is nonrotatably or fixedly received in aperture 62*b* to, when the gears are rotatably driven in either direction, rotate output cam 62 in either direction. As shown, output cam 62 is secured to engaging end 60*a* by way of a spline and screw arrangement. The output cam 62 comprises a cam arm 62*c* that extends radially outwardly from central portion 62*a* and an end with a protrusion 62*d*. Protrusion 62*d* and actuator arm 58 are in engagement (via the protrusion being slidably received in a slot of the actuator arm, such as best seen in FIGS. 3, 5, 7 and 9), such that, responsive to actuation of motor 50, output cam 62 imparts pivotal movement of actuator arm 58 about a pivot axis or pivot pin or joint 58*b* (see FIG. 5). As actuator arm 58 moves, the cam surface 58*a* of actuator arm 58 interacts with (and slides along) the driving surface 32*c* of crank 32 to impart pivotal movement of crank 32 (about its pivot axis 32*a*). The pivot axis 32*a* of crank 32 is generally normal or perpendicular to the pivot axis 58*b* of actuator arm 58. This movement, in turn, causes crank 32 and follower 34 to cooperatively pivot about their respective pivots 32*a* and 34*a*, relative to base portion 14, to move handle portion 16 between the flush position and the deployed position.

Figure 22A:
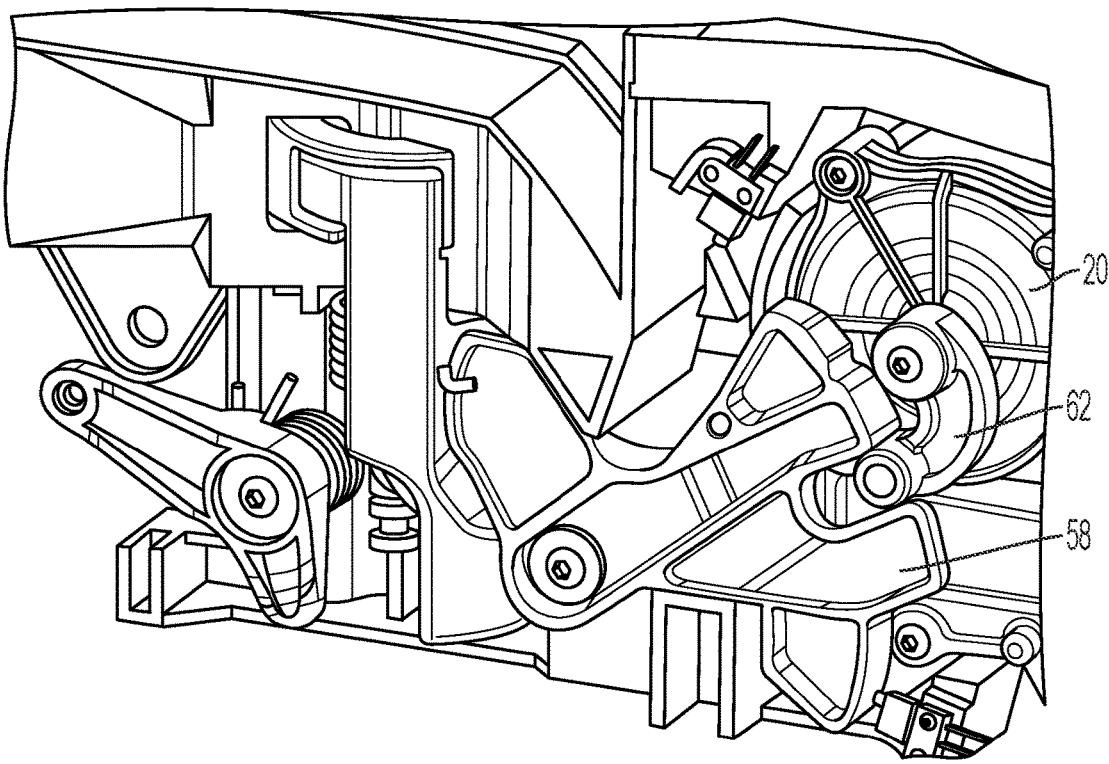
FIGS. 22A and 22B are views of an actuator output cam with a handle in recessed and deployed positions.
Figure 22B:
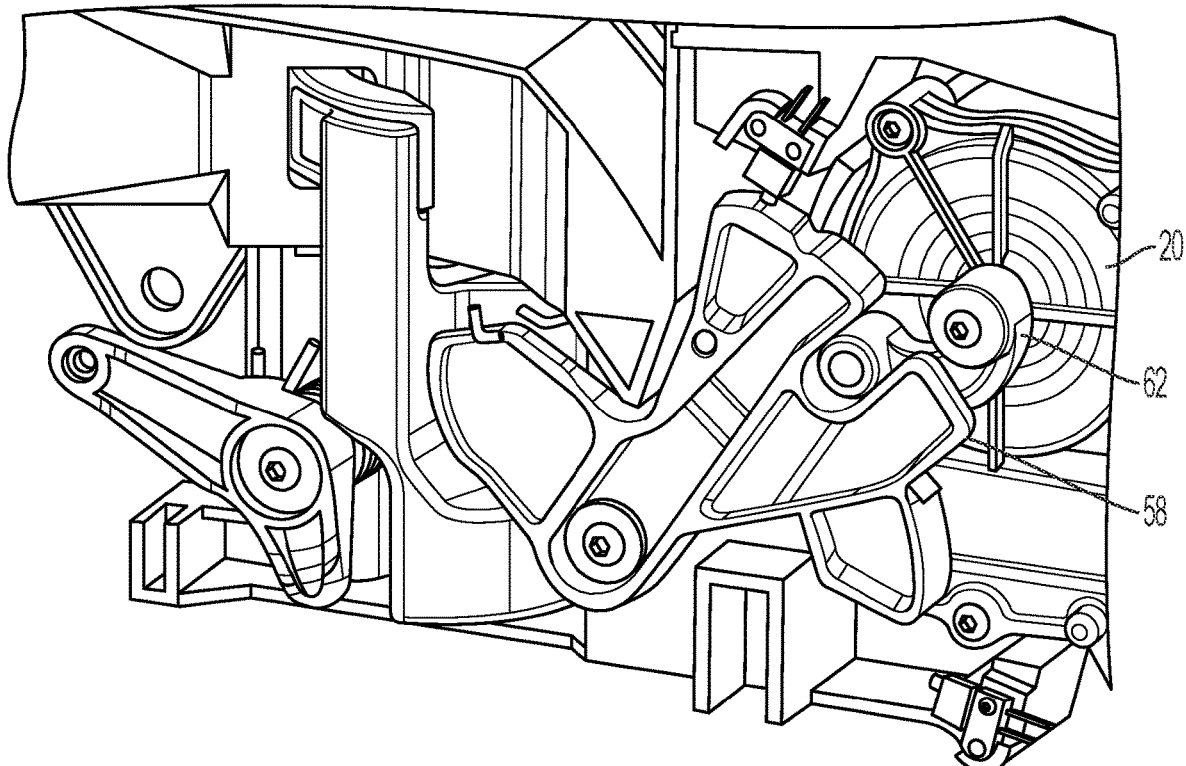
Figure 24:
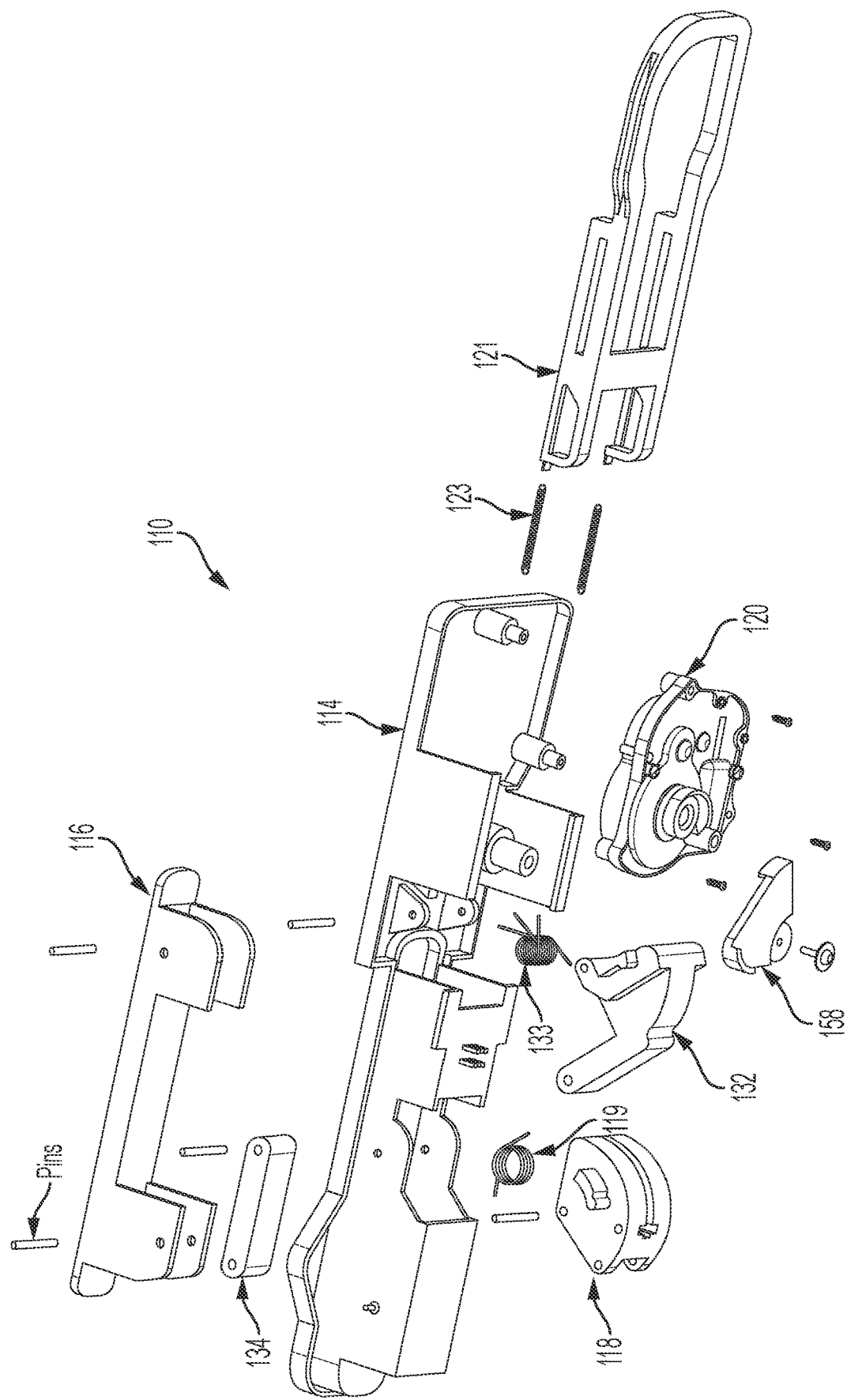
Figure 25:
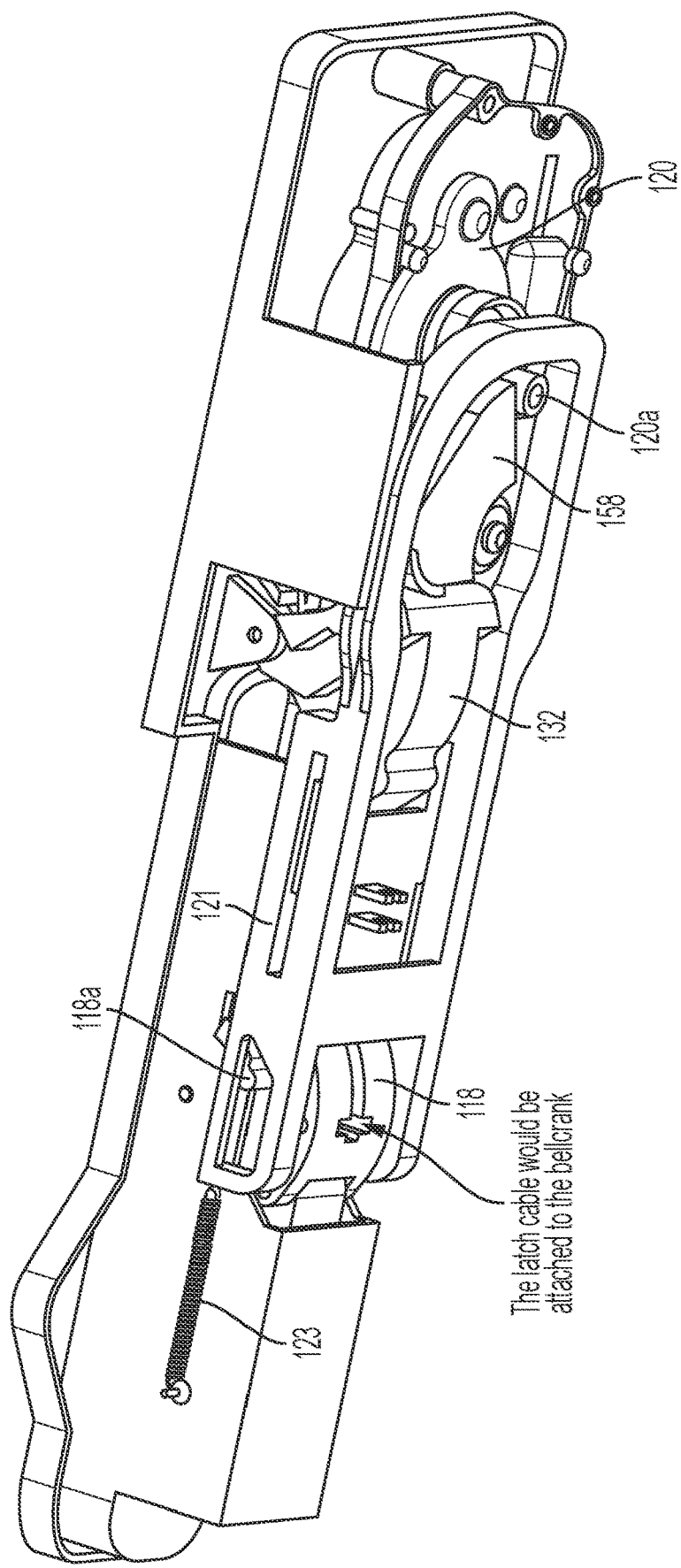
FIG. 25 is a perspective view of the door handle assembly, showing where the door latch cable attaches to the bellcrank.

Examples of the foregoing configuration can have the benefit of providing mechanical advantage between actuator 20 and handle portion 16. Other examples of the foregoing configuration can meet different torque requirements for different platforms. Still other examples of the foregoing configuration allow a maximum torque generated by actuator 20 to vary with handle position. For example, in the illustrated embodiment, the torque generated by actuator 20 when the handle is in the flush position (FIG. 22A) is greater than the torque generated by actuator 20 when the handle is in the deployed position (FIG. 22B).

Figure 7:
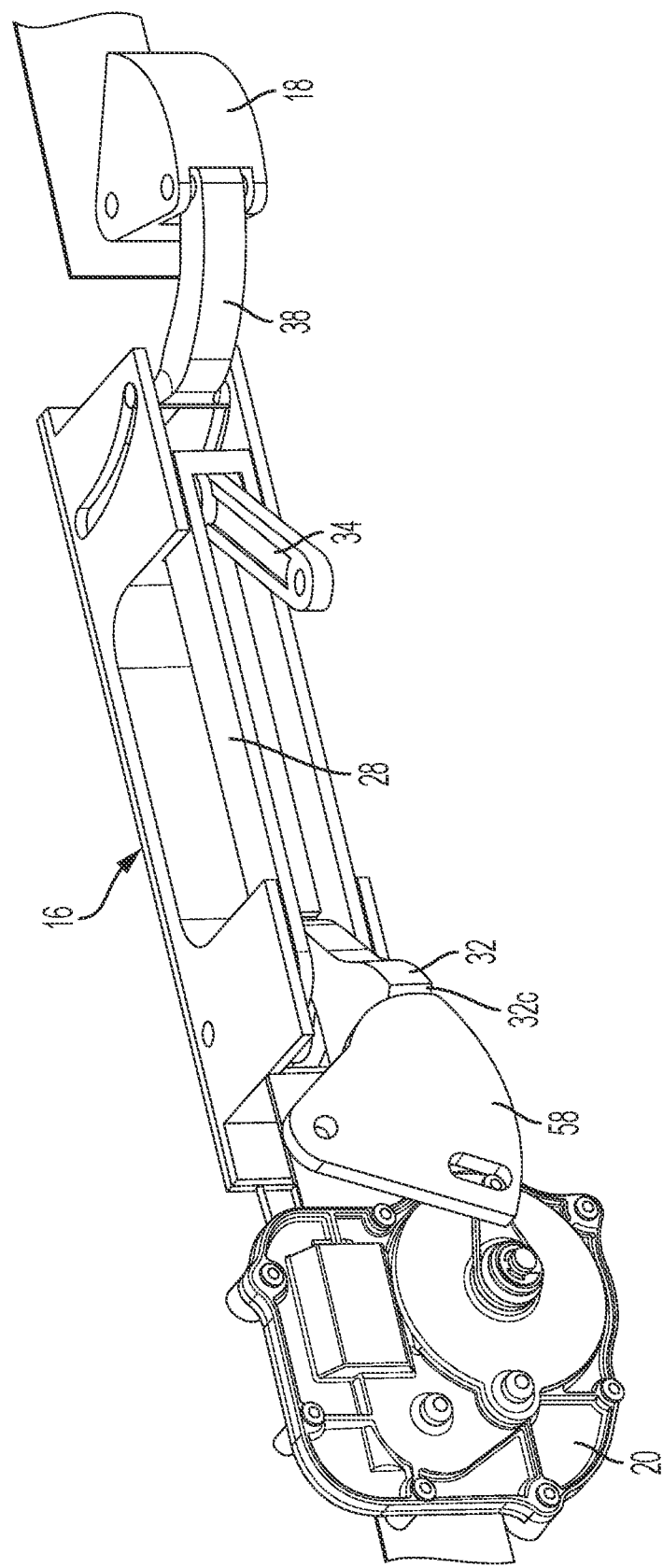
FIG. 7 is a perspective view of the extendable flush door handle assembly of the present invention, shown with the door handle moved to its use or deployed or ready or partially extended position.

When the actuator 20 is actuated (such as by a trigger, signal or the like from a vehicle or door control module or the like), the output gear 60 of the actuator 20 is rotated to turn the output cam 62 and pivot the actuator arm 58. This, in turn, imparts a pivotal movement of crank 32 resulting in crank 32 and follower 34 pivoting together about their respective pivots 32*a* and 34*a*, relative to base portion 14, to move the door handle portion 16 from its non-use or flush or recessed or initial position (FIGS. 4 and 5) to its ready or partially extended or graspable position (FIGS. 6 and 7). When in its ready position, a user may readily grasp the grasping portion 22 of handle portion 16 (which is exposed and graspable when the handle portion 16 is at least partially extended from the base portion) and may pull at the handle portion to move the handle portion 16 to its actuating position (FIGS. 8 and 9) to cause bellcrank 18 and latch mechanism of the door (not shown) to disengage and open the vehicle door. When the user releases the handle portion 16, a first biasing element urges the handle portion 16 back to its initial or non-use position. At or around the same time, the actuator 20 functions to move or rotate the output cam 62 back to its initial position so that actuator arm 58 is no longer acting against the crank 32 and the crank 32 moves back to its initial position. The crank 32 may move back toward and to its initial position via the urging or biasing of a biasing element.

Figure 10:
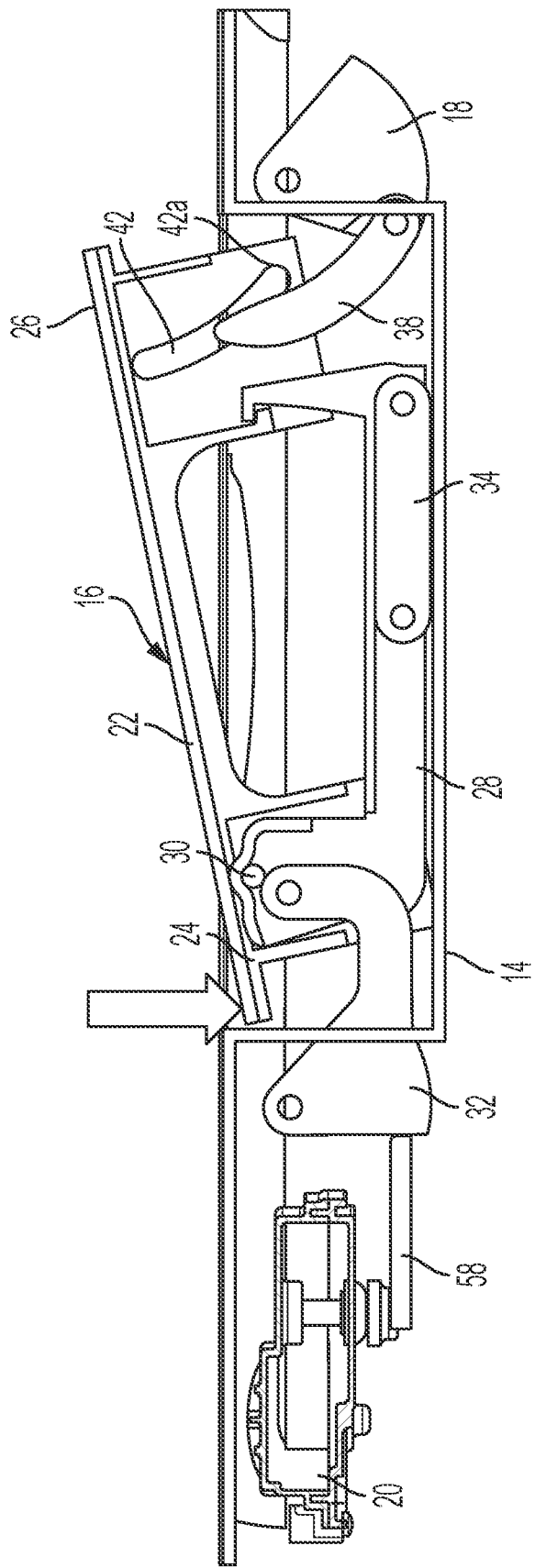
FIG. 10 is a top plan view of the extendable flush door handle assembly of the present invention, shown with the door handle moved out, manually.
Figure 11:
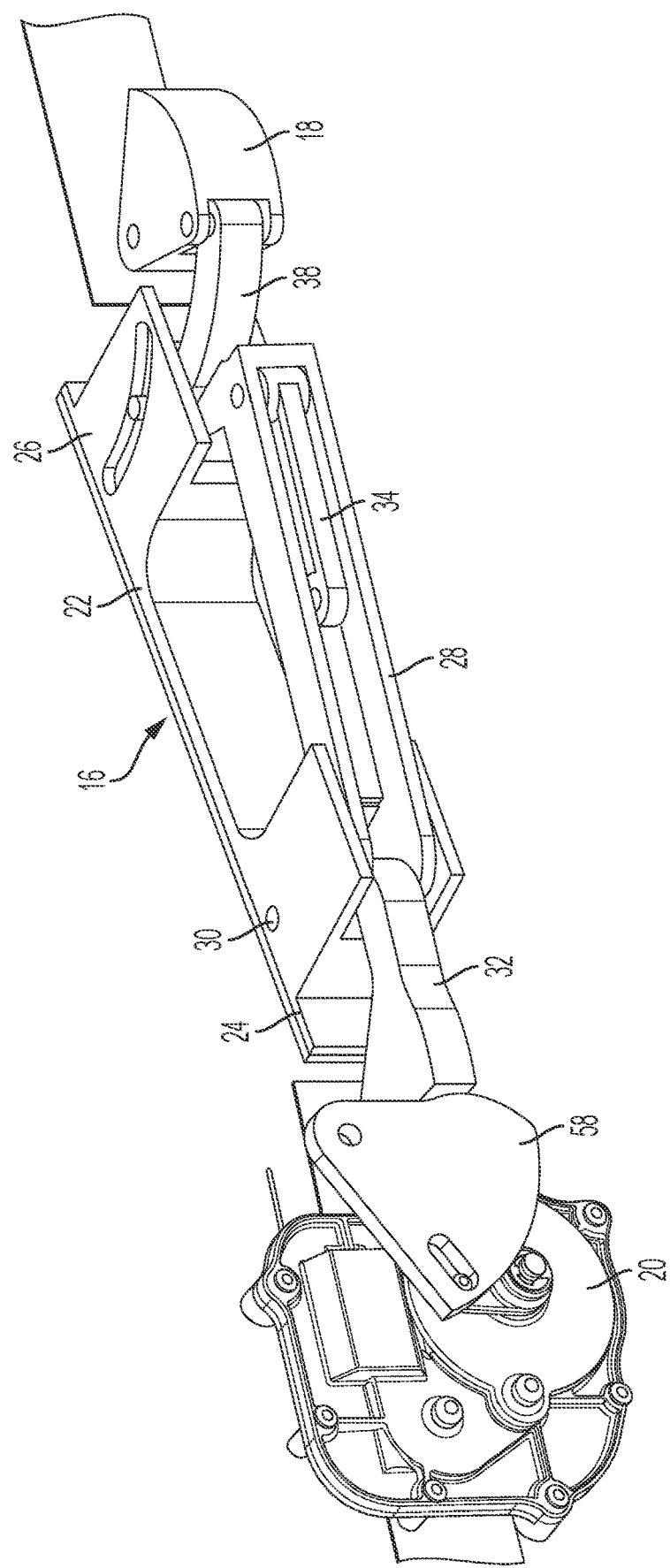
FIG. 11 is a perspective view of the extendable flush door handle assembly of the present invention, shown with the door handle moved out, manually.
Figure 12:
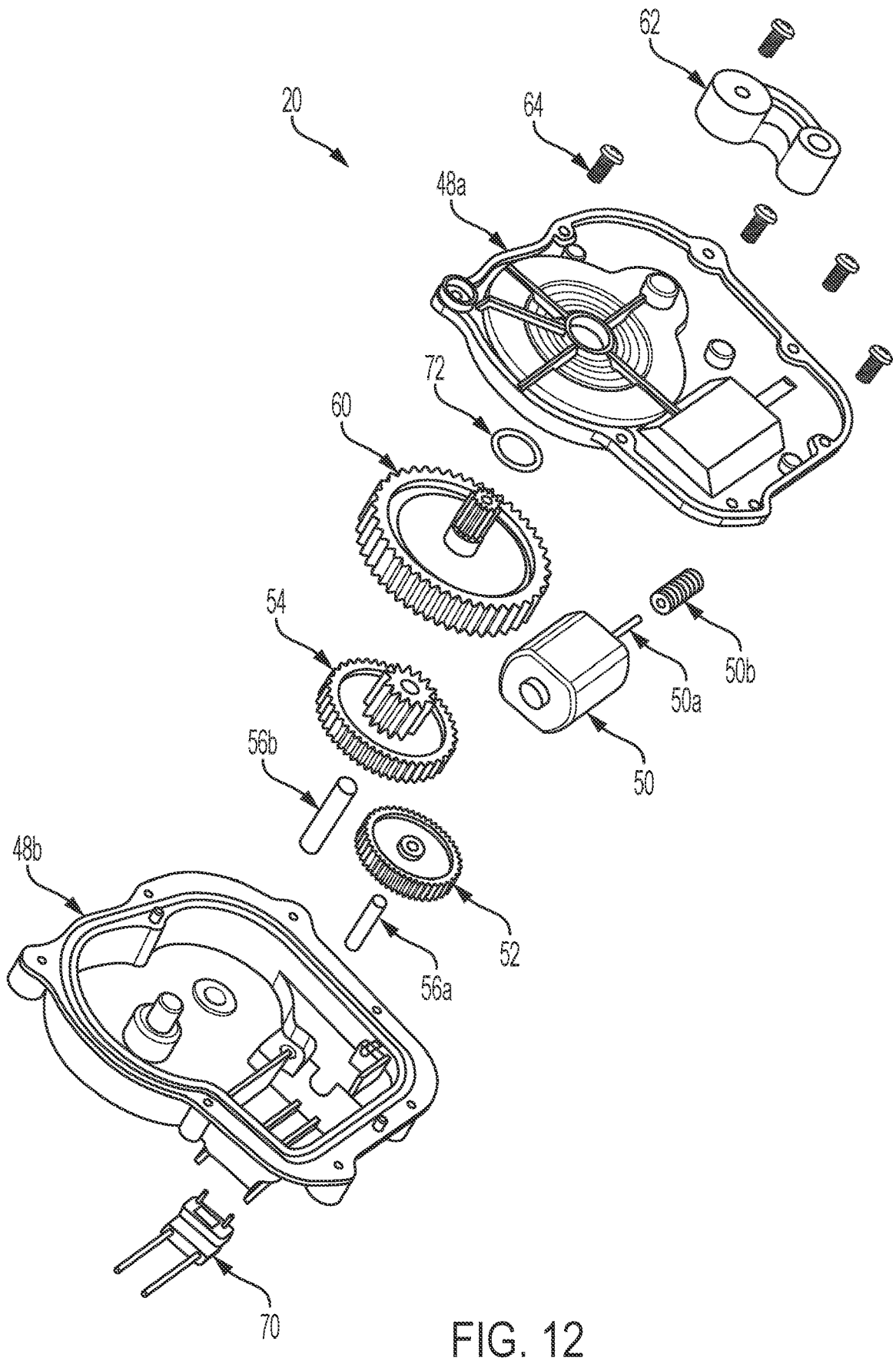
FIG. 12 is an exploded perspective view of an actuator for moving or pivoting the door handle of the extendable flush door handle assembly of the present invention to a use position.
Figure 13A:
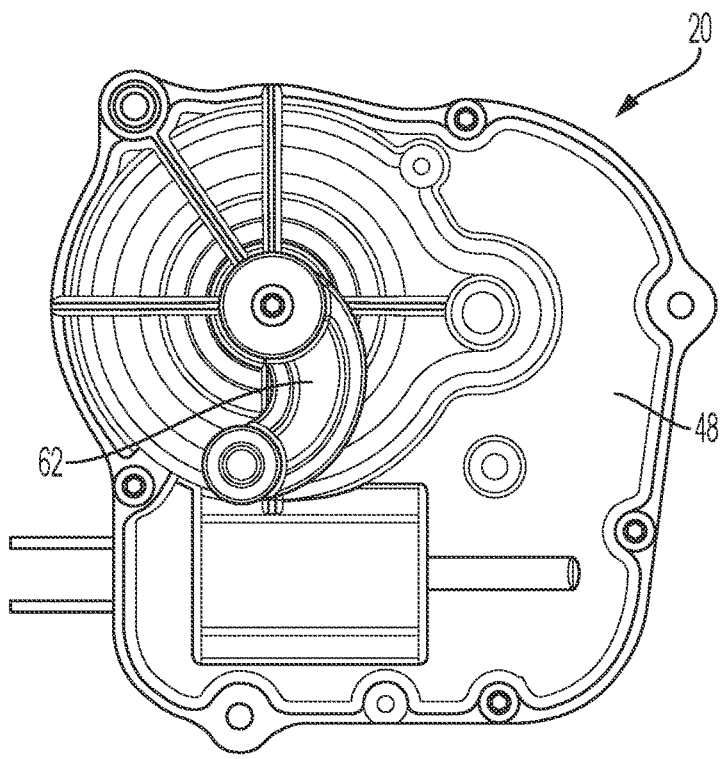
FIG. 13A-C are plan views of the actuator of FIG. 12.
Figure 13B:
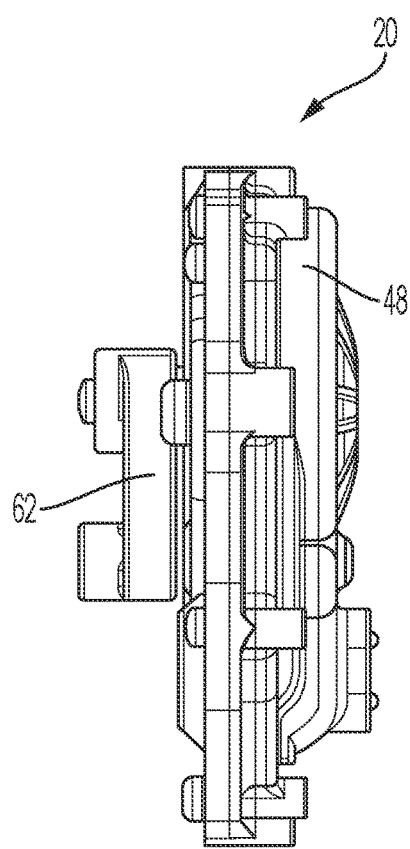
Figure 13C:
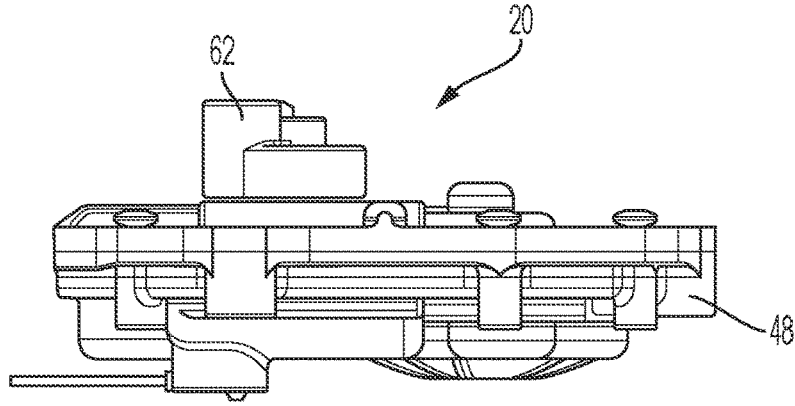
Figure 14A:
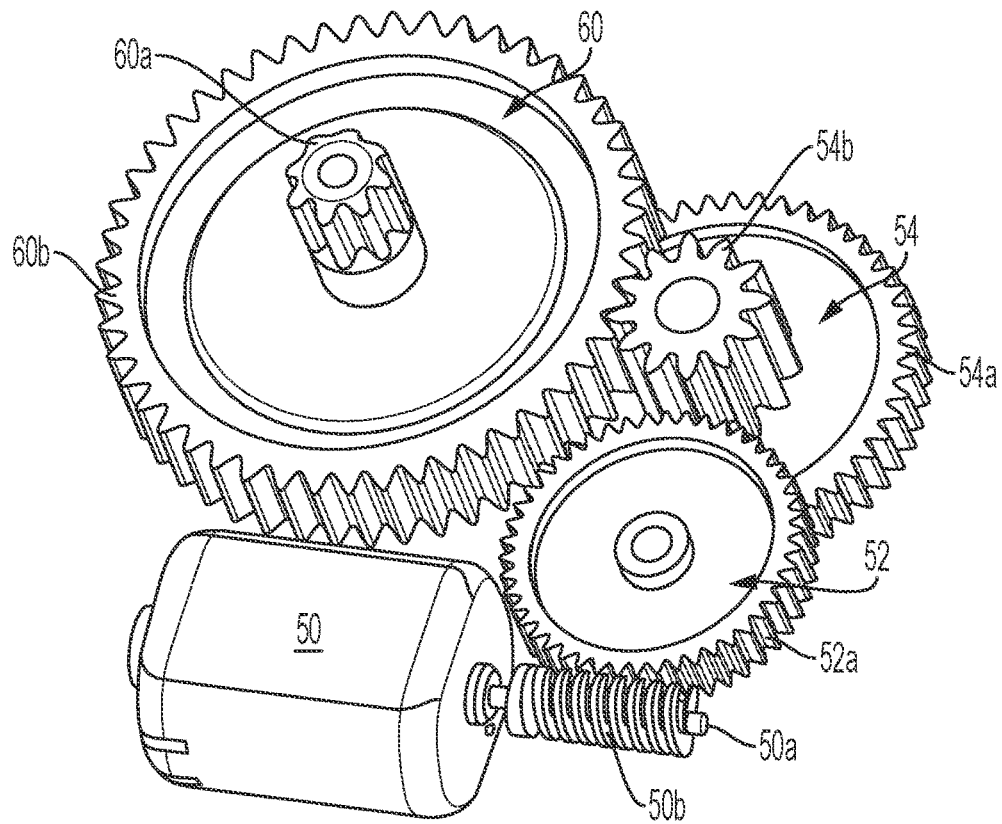
FIGS. 14A-14B are opposite views of a gear train of the actuator of FIG. 12.
Figure 14B:
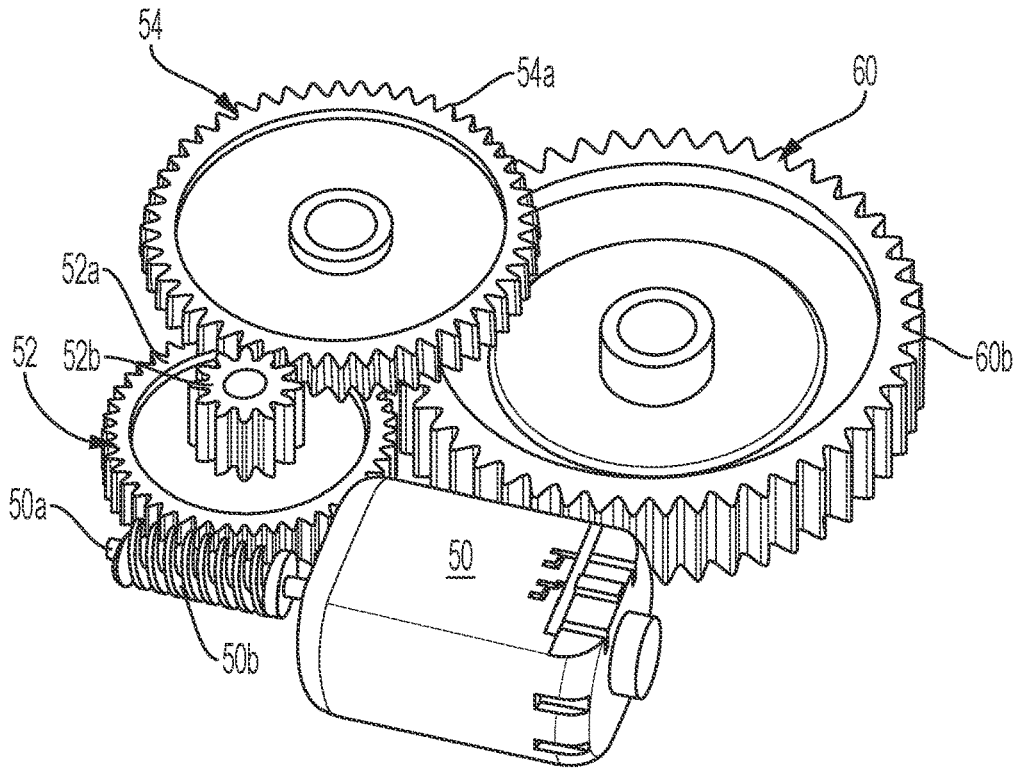
Figure 15:
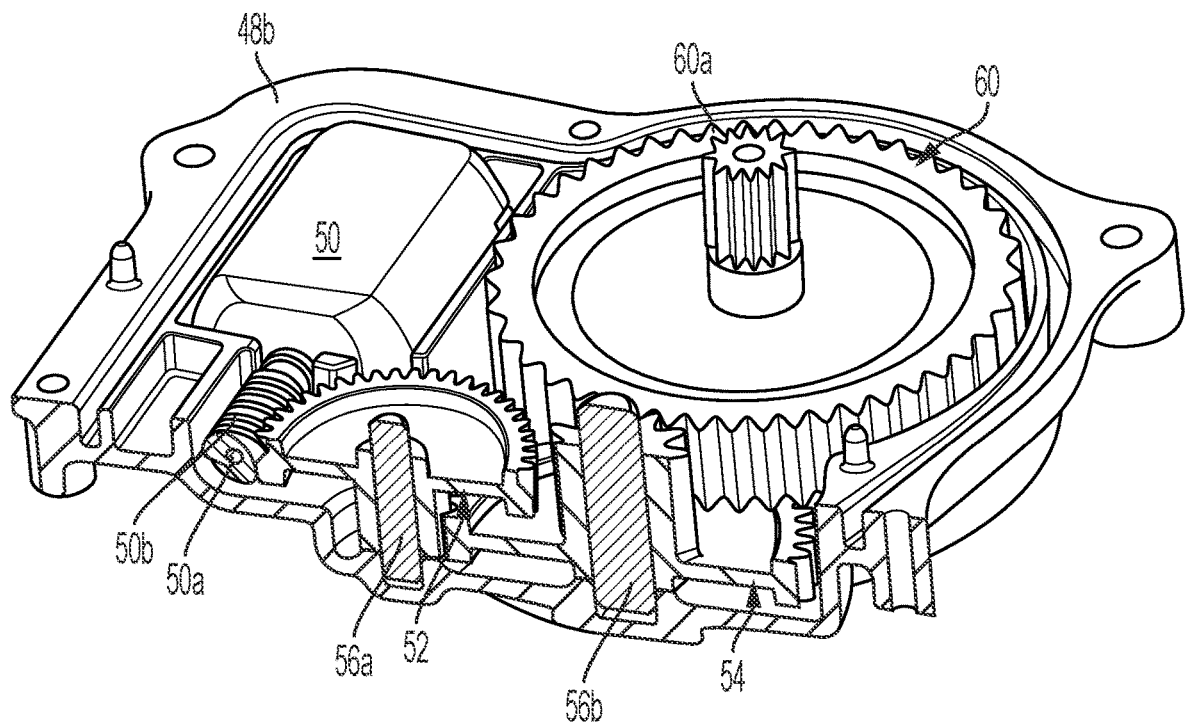
FIG. 15 is a cutaway perspective view of the actuator of FIG. 12, with one of the cover portions removed to show the internal components.

Optionally, and desirably, a user may manually move the door handle to its ready position, such as for situations where the vehicle power is lost (such as when the vehicle battery is dead or the like) or where the user may not be carrying the key fob or the like. For example, as shown in FIGS. 10 and 11 a user may push (shown as an arrow) at the base end 24 of the handle portion 16 at the opposite side of the pivot 30 from the grasping portion 22, whereby the handle portion 16 may pivot about pivot 30 to move towards its ready position. The spring force or return or biasing force of second biasing element may be selected to provide a desired return force but not be so high as to be difficult for the user to overcome the spring force when manually moving the handle portion towards the ready position.

Therefore, the exterior door handle assembly for a vehicle door comprises a base portion 14 disposed at a door handle region of a vehicle, and a handle portion 16 including a base end 24, a swing end 26, and a grasping portion 22 disposed between the base end and the swing end. The handle portion is movable relative to the base portion between a recessed position (FIG. 4), where the grasping portion of the handle portion is recessed at the base portion so as to be not graspable by a user (and with an outer surface of the grasping portion of the handle portion being generally flush or co-planar with an outer surface of the door handle region at and around the handle portion), and a deployed position (FIG. 6), where the grasping portion of the handle portion protrudes outward from the base portion to be graspable by the user. The handle assembly includes a connector 28 having (i) a first end pivotally connected to the base end of the handle portion and (ii) a second end movably coupled with the swing end of the handle portion. The first end of the connector is pivotally attached at a first connecting link 32 that is pivotally attached at the base portion, and the second end of the connector is pivotally attached at a second connecting link 34 that is pivotally attached at the base portion.

The door handle assembly further comprises an actuator 20 that includes a motor that is electrically operable in response to an input signal. Responsive to the input signal, the motor operates and the actuator (such as an output cam 62 of the actuator) engages a portion (such as a surface 32c of the connecting link 32) of the first connecting link 32 to impart pivotal movement of the first connecting link to cause the first connecting link 32 and the second connecting link 34 to cooperatively pivot relative to the base portion and to move the handle portion between the recessed position and the deployed position. When the handle portion is at the deployed position (FIG. 6), the swing end of the handle portion is manually movable further outward from the base portion to open the door of the vehicle (see FIG. 8).

The actuator, when the motor is operated, pivotally moves the actuator arm or output cam 62, which has a cam surface that engages the portion or driving surface 32c of the first connecting link 32 to impart pivotal movement of the first connecting link 32 to move the connector 28 and the base end of the handle portion toward the deployed position. Outward movement of the connector imparts outward movement of the swing end of the handle portion, such that the handle portion moves outward from the door while remaining parallel to the door of the vehicle.

The input signal (that causes the handle portion to move to the deployed position) comprises at least one selected from the group consisting of (a) a signal from a passive entry device, (b) a signal from a remote transmitting device, and (c) a signal indicative of a user actuating a door unlock button of the vehicle.

When the handle portion is at the recessed position, the base end of the handle portion is manually movable inward towards the base portion to cause the swing end of the handle portion to move outward from the base portion to move the handle portion towards the deployed position without operation of the motor.

The bellcrank is coupled with a door latch of the door of the vehicle (such as via a cable or other mechanical linkage or such as via an electromechanical connection or the like). When the swing end of the handle portion is manually moved further outward from the base portion (and the respective end of the connector) so as to pivot the handle portion at the base end of the handle portion, movement of the swing end of the handle portion pivots the bellcrank to open the door of the vehicle. As can be seen with reference to FIGS. 6 and 8, as the swing end of the handle is pulled outward, the swing end of the handle portion pulls at a bellcrank link 38 to impart pivotal movement of the bellcrank 18 to pull at and release the latch mechanism of the door. As can also be seen with reference to FIGS. 6 and 8, as the swing end of the handle is pulled outward, the swing end moves relative to the connector 28, with a lip of the connector end engaging a corresponding lip of the swing end of the handle portion to limit how far the swing end of the handle portion moves relative to the connector.

The door handle assembly may include a reset element that is operatively coupled with the actuator and the bellcrank. When the handle portion is deployed, actuation of the actuator in a direction opposite from the direction for deploying the handle portion moves the reset element to pivot the bellcrank and the first connecting link in a retracting direction to retract the handle portion toward the recessed position.

Optionally, a door handle assembly in accordance with aspects of the present invention may have an actuator that functions to extend the door handle assembly and that also functions to electrically reset the handle to its flush position if the handle is stuck open in any position. For example, and with reference to FIGS. 23-39, a door handle assembly 110 includes a base portion or bracket 114 that is mountable to a vehicle door and a handle portion or strap portion 116 that is pivotally mounted to the bracket 114, such as in a similar manner as described above with respect to the door handle assembly 10. The handle portion 116 is electromechanically pivotable or movable or laterally movable relative to the door and the base portion 114 to move to its ready or operational or grippable or graspable or person-operable position and is then graspable or grippable by a user and is manually moved (such as via pulling by the user) to actuate a bellcrank 118 at base portion 114, which in turn actuates or releases the latch mechanism of the door to open the vehicle door. The door handle assembly 110 includes an electrically operable or electromechanical actuator 120 at base portion 114 for imparting the lateral or outboard movement of handle portion 116 relative to base portion 114 (such as automatically imparting such handle movement in response to a signal from a key fob or a passive entry system or the like) so that handle portion 116 is automatically moved from its recessed position to its ready or graspable position where a user can grasp the handle portion to pull or move the handle portion for unlatching and/or opening the vehicle door and/or the like, as discussed below.

Figure 28:
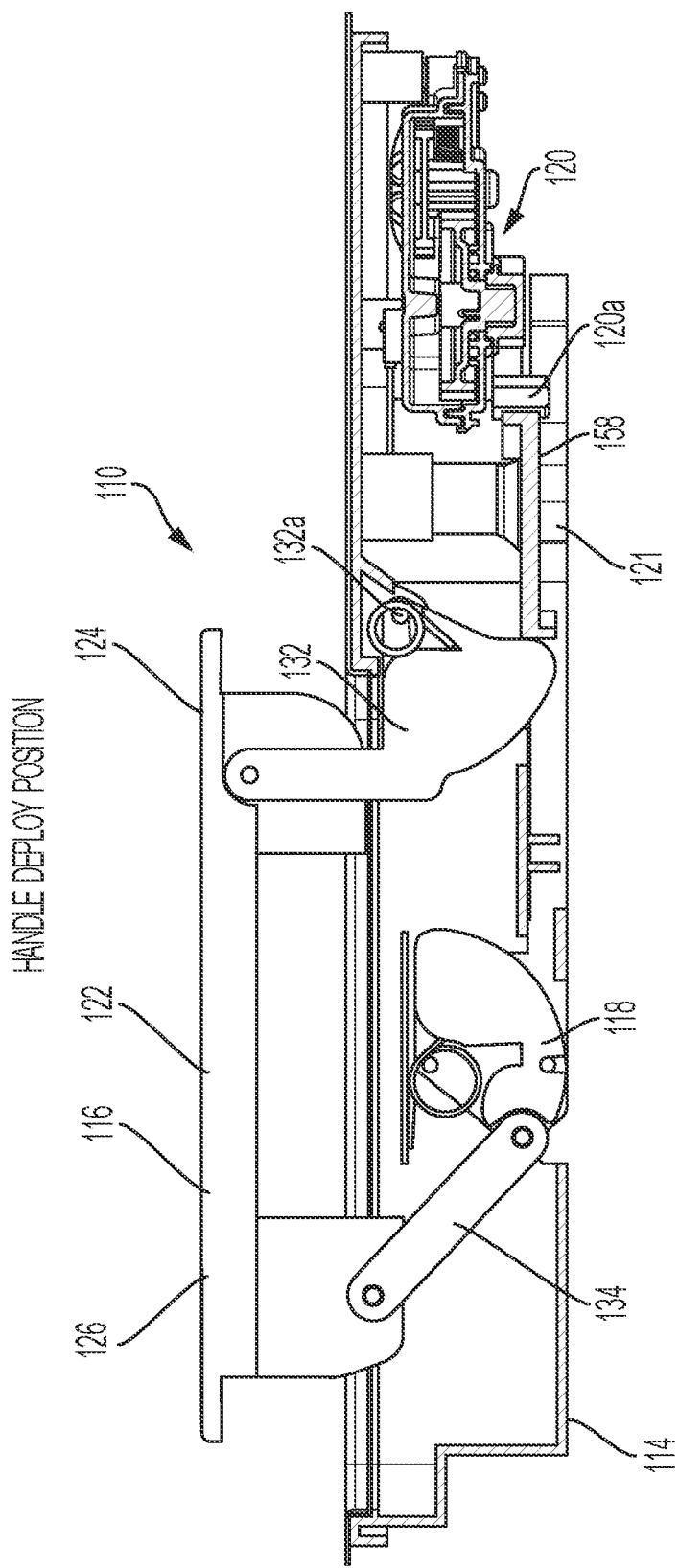
FIG. 28 is a side elevation and partial sectional view of the door handle assembly, shown in its handle deployed or extended position.

The handle portion 116 includes a grasping portion 122 disposed between a base end 124 and a swing end 126. The swing end 126 of the handle portion 116 is pivotally mounted at a follower or connecting link 134, and the base end 124 of the handle portion 116 is pivotally mounted at a crank or connecting link 132, with the follower or connecting link 134 pivotally attached to the bellcrank 118 and the crank 132 pivotally attached at the bracket 114. The actuator 120 operates to pivot an actuator arm 158 (such as via pivoting an output cam 162 in a similar manner as described above), which imparts pivotal movement of the crank to extend the door handle 116 to its extended position. The actuator arm pivots about an axis 158a that is generally normal or perpendicular to the axis 132a about which the crank 132 pivots (as can be seen with reference to FIG. 28, the pivot axis of actuator arm 158 is vertical and the pivot axis of the crank 132 is horizontal and normal to the plane of the drawing). The concerted movement of crank 32 and follower 134 moves the handle portion 116 in and out relative to base portion 114, with the handle portion 116 remaining generally parallel to the base portion and to the surface of the door region of the vehicle door when the handle portion is moved between the recessed position (FIG. 26) and the deployed position (FIG. 28). As can be seen with reference to FIGS. 26 and 28, the handle portion moves or swings outward and in a direction toward the base end of the handle portion as it moves from the recessed position to the deployed position.

Figure 26:
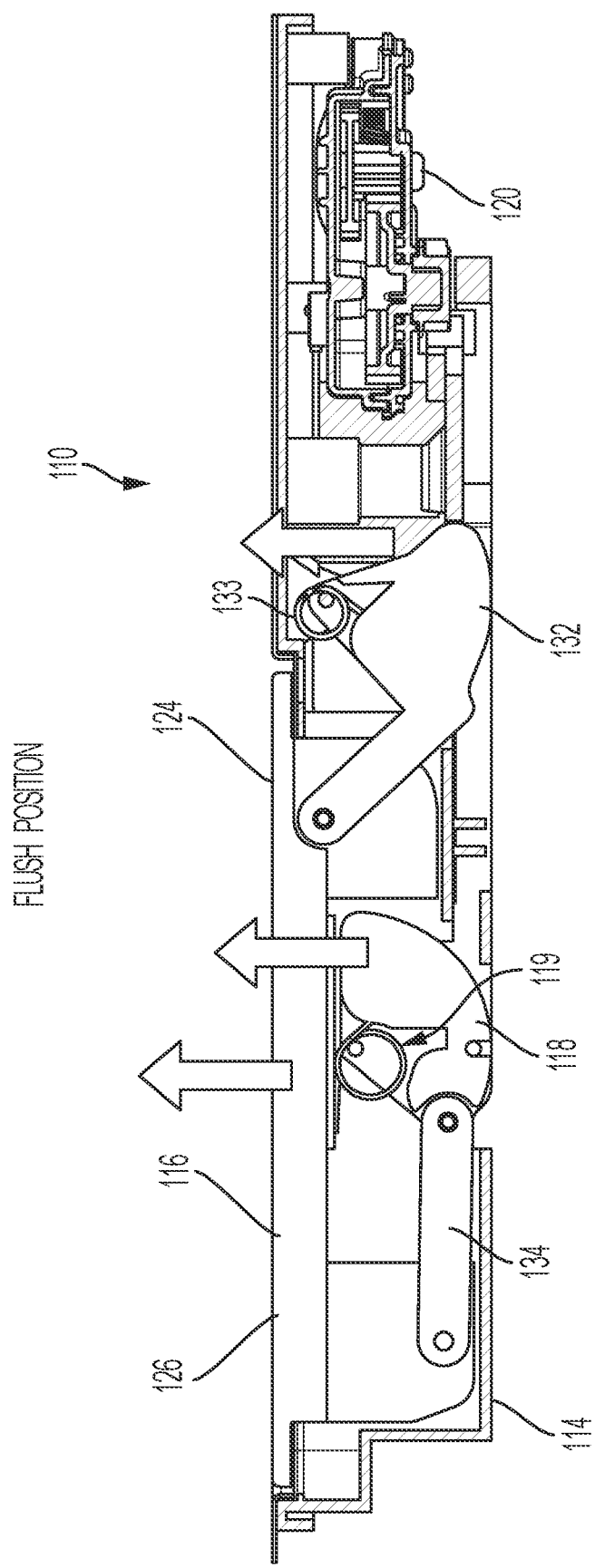
FIG. 26 is a side elevation and partial sectional view of the door handle assembly, shown in its recessed position.
Figure 27:
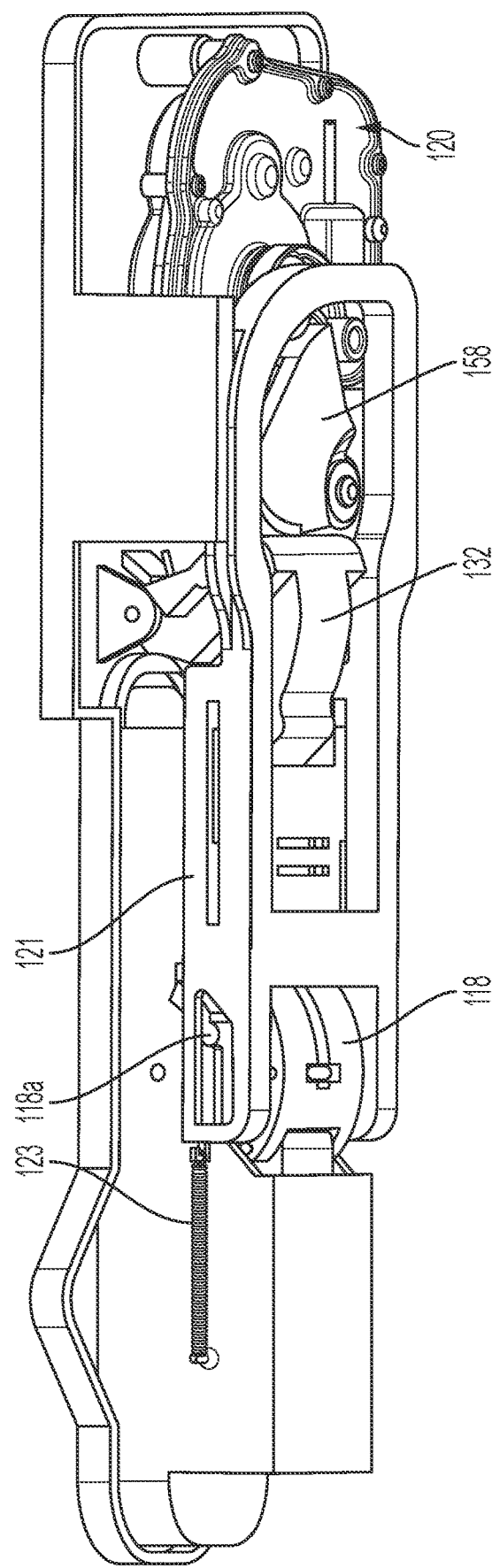
FIG. 27 is a perspective view of the door handle assembly of FIG. 26.

The door handle assembly 110 includes a reset plate 121 that is movable along the bracket 114 via deployment of the handle portion and via operation of the actuator to rotate the actuator portion of the actuator in the opposite direction from the direction of rotation to extend the handle. As shown in FIGS. 26 and 27, when the door handle is in its flush position, the bellcrank spring 119 and a crank spring 133 function to urge the handle toward the retracted (flush) state from the unlatch state and to limit or prevent the handle from rotating during electric deployment. As shown in FIG. 27, the reset plate 121 is slidably movable along the bracket 114 (via grooves or channels along the reset plate that receive tongues or tabs of the bracket), and includes a slot that receives a pin or protrusion 118a of the bellcrank 118. The reset plate is spring-biased toward the position shown in FIG. 27 via reset plate springs 123 connected between the end of the reset plate and the bracket. After the reset plate is moved to return the handle to the flush position (as discussed below), the springs 123 urge the reset plate back to the position shown in FIG. 27 when the actuator is next actuated, such as to extend the handle.

Figure 29:
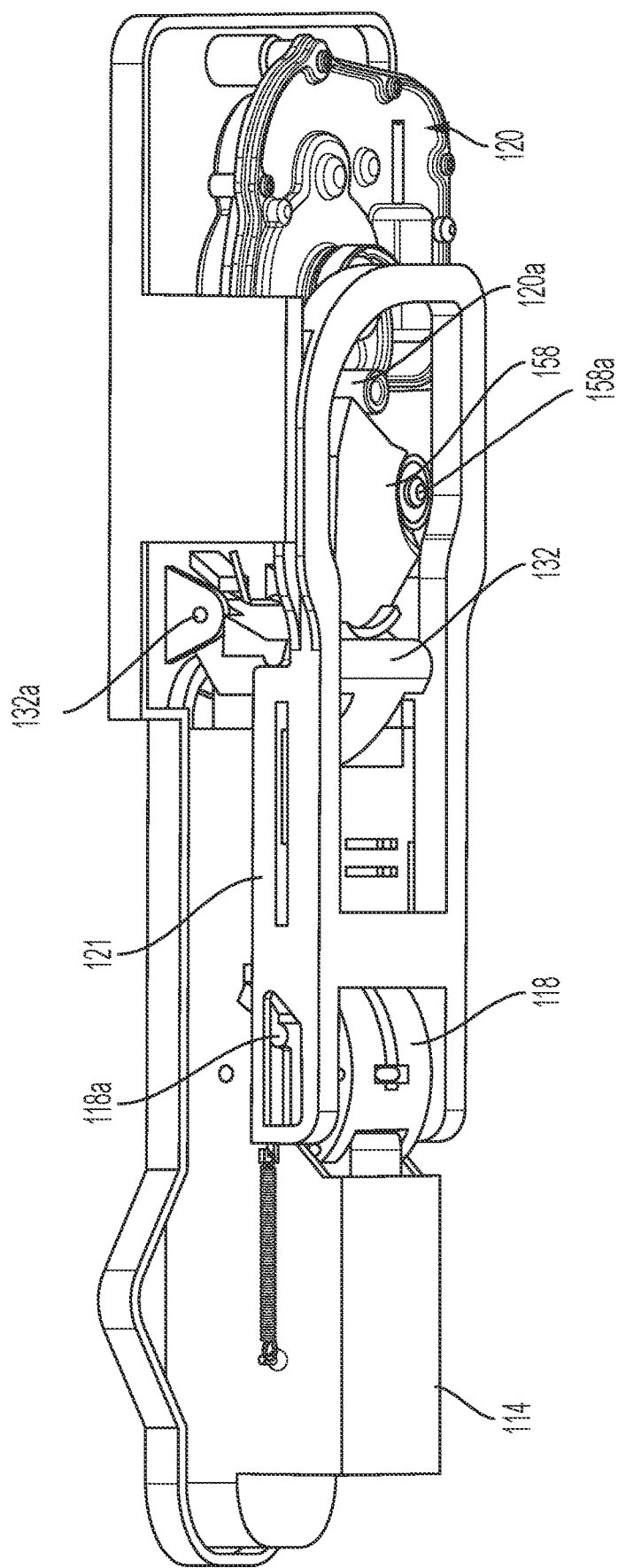
FIG. 29 is a perspective view of the door handle assembly of FIG. 28.

As shown in FIGS. 28 and 29, when the handle is deployed, the actuator 120 rotates its actuating portion 120a to impart pivotal movement of output cam 162 and the actuator arm 158, which pivots the crank 132, which in turn causes pivoting of the follower 134 to extend the door handle. During such extension of the handle, the bellcrank 118 does not rotate relative to the bracket and the reset plate 121 does not move.

Figure 30:
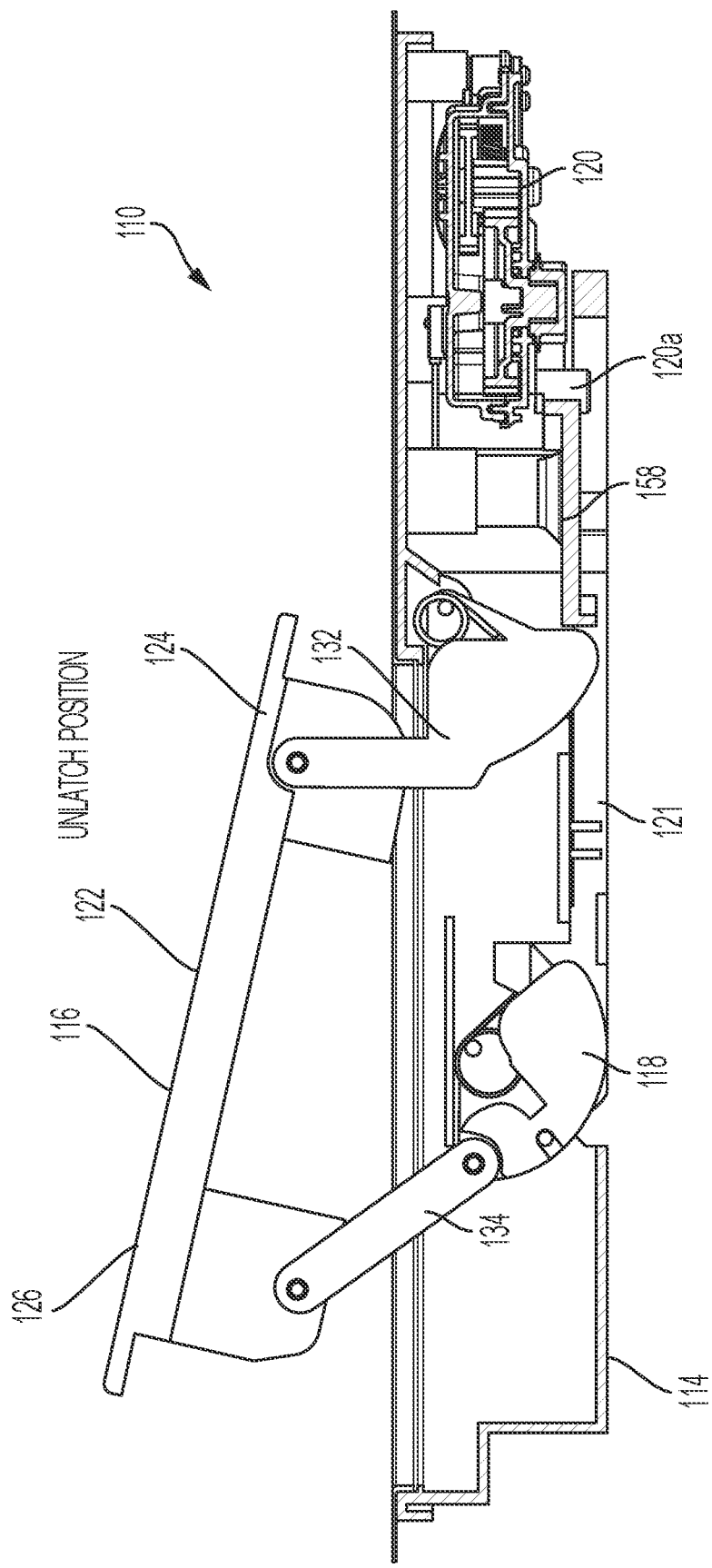
FIG. 30 is a side elevation and partial sectional view of the door handle assembly, shown in its unlatch or pulled position.
Figure 31:
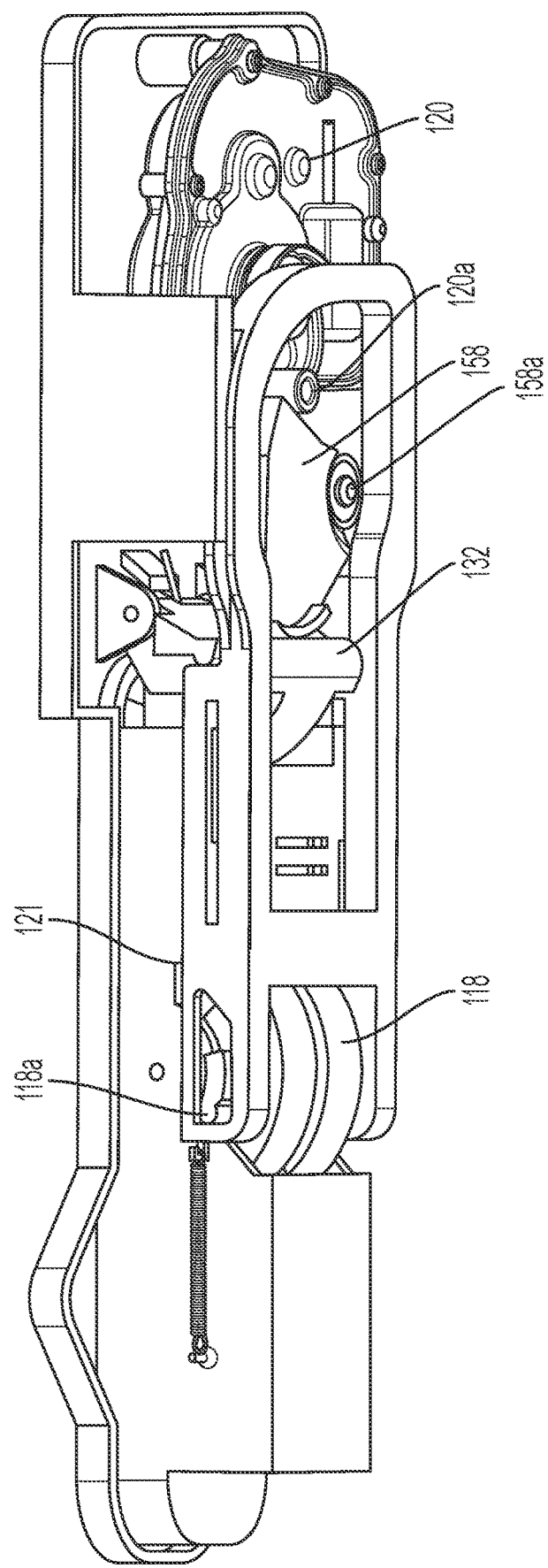
FIG. 31 is a perspective view of the door handle assembly of FIG. 30.

As shown in FIGS. 30 and 31, when a user grasps the extended handle and pulls, the handle pivots and imparts rotation of the bellcrank 118 to actuate the door latch to open the vehicle door. During such actuation of the door handle, the crank 132 and the actuator arm and the reset plate do not move. However, and as can be seen in FIG. 31, the bellcrank 118 pivots to pull at the door lock cable (or other door lock or latch mechanism) and to move the pins 118a toward the opposite end of the slot in the reset plate 121. The door lock cable may attach at an outer part of the bellcrank (see FIG. 25) such that pivotal movement of the bellcrank pulls at the cable to actuate the door latch to allow the vehicle door to be opened.

Figure 32:
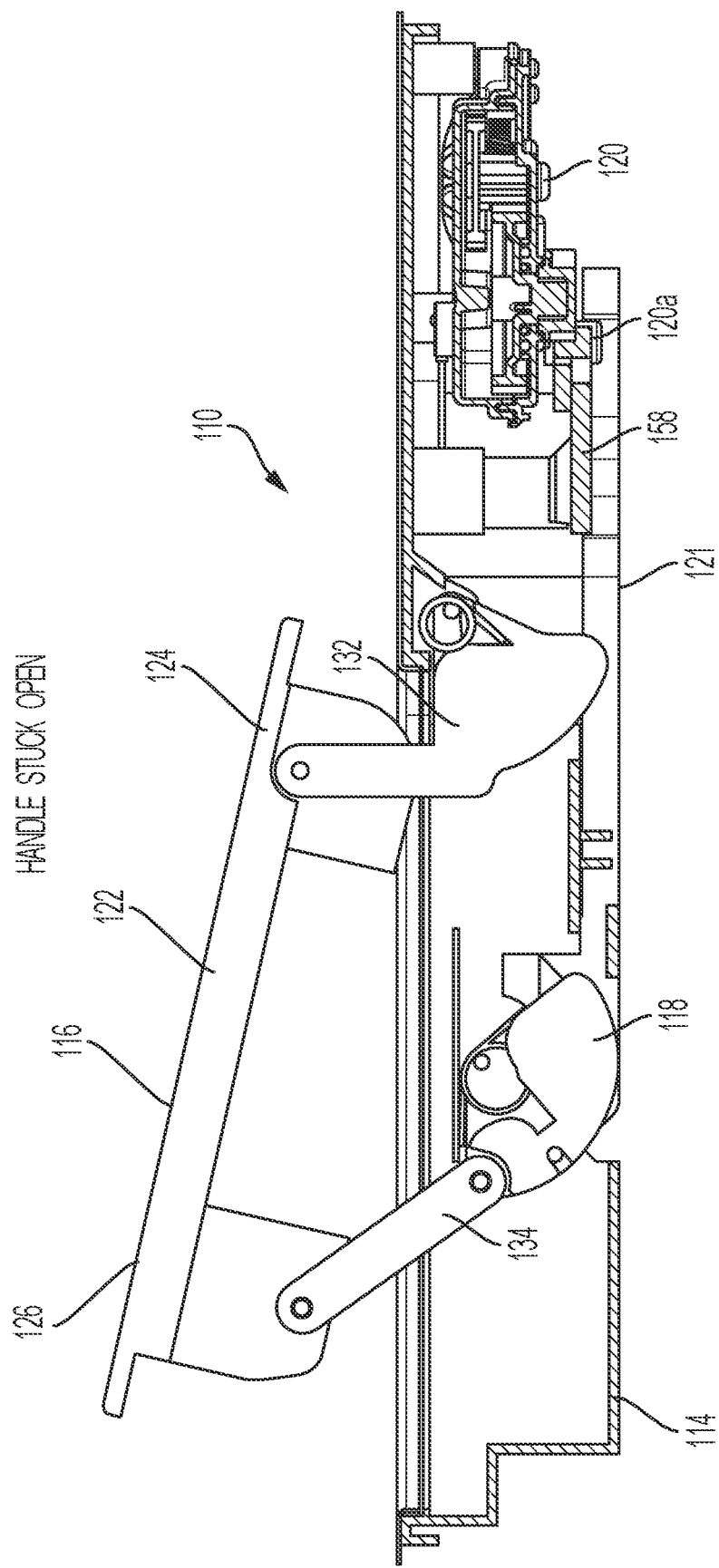
FIG. 32 is a side elevation and partial sectional view of the door handle assembly, shown in its handle stuck open position.
Figure 33:
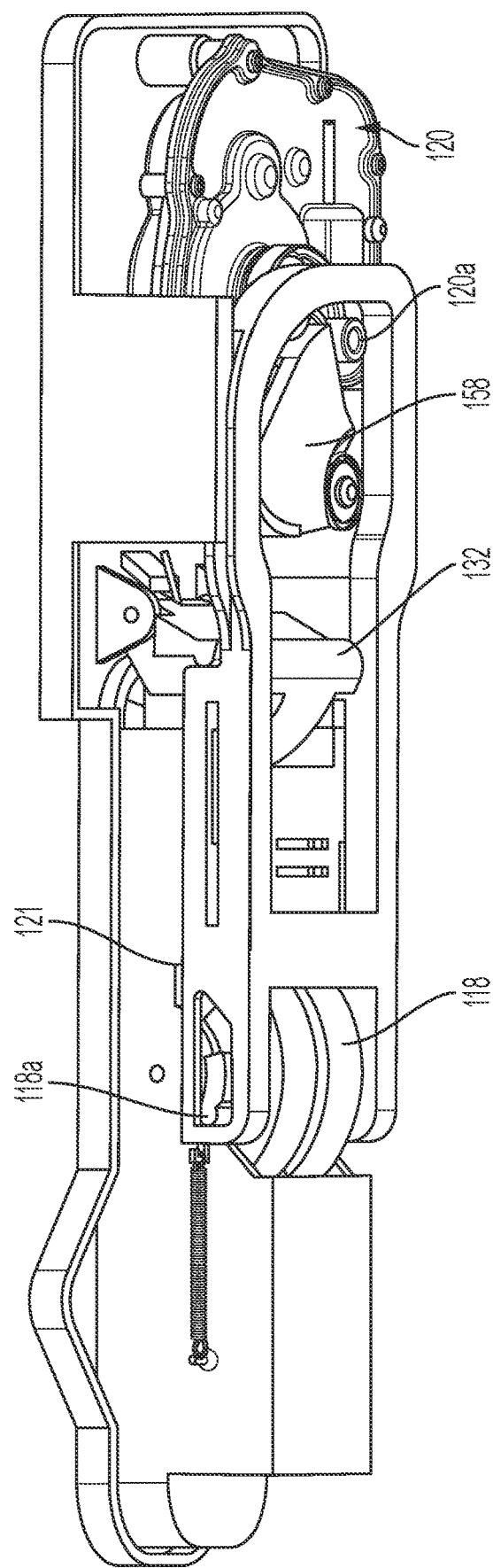
FIG. 33 is a perspective view of the door handle assembly of FIG. 32.

The bellcrank and crank are spring-biased to return to their normal positions and to retract the handle after the door is opened, and after the actuator pivots the actuating portion 120a in the opposite direction to allow for the actuator arm to return to its normal position (via spring-biasing from a torsional spring or the like at the actuator arm and bracket), such as shown in FIG. 33. However, and such as shown in FIGS. 32 and 33, the handle may not retract even when the actuator has reversed itself to the initial state.

Figure 34:
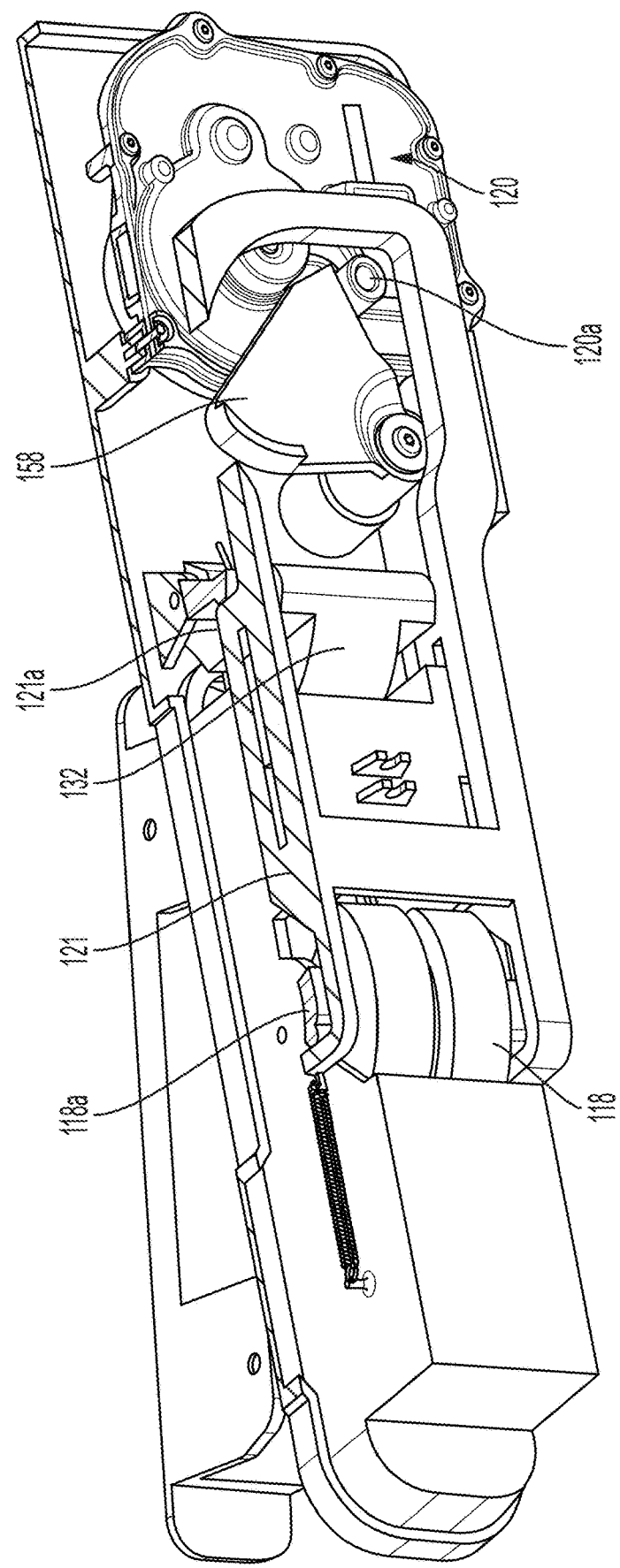
FIGS. 34 and 35 are perspective views showing the movement of the reset plate to return the door handle to its recessed position.
Figure 35:
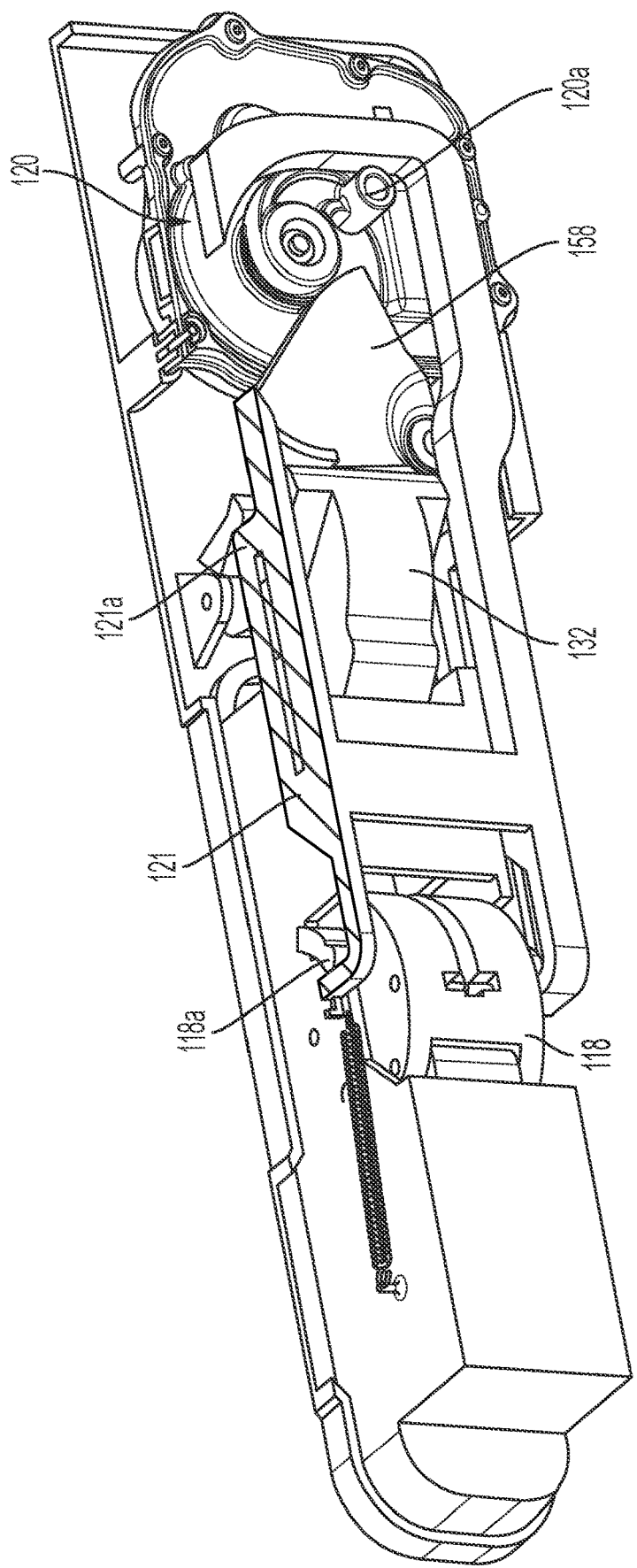
Figure 36:
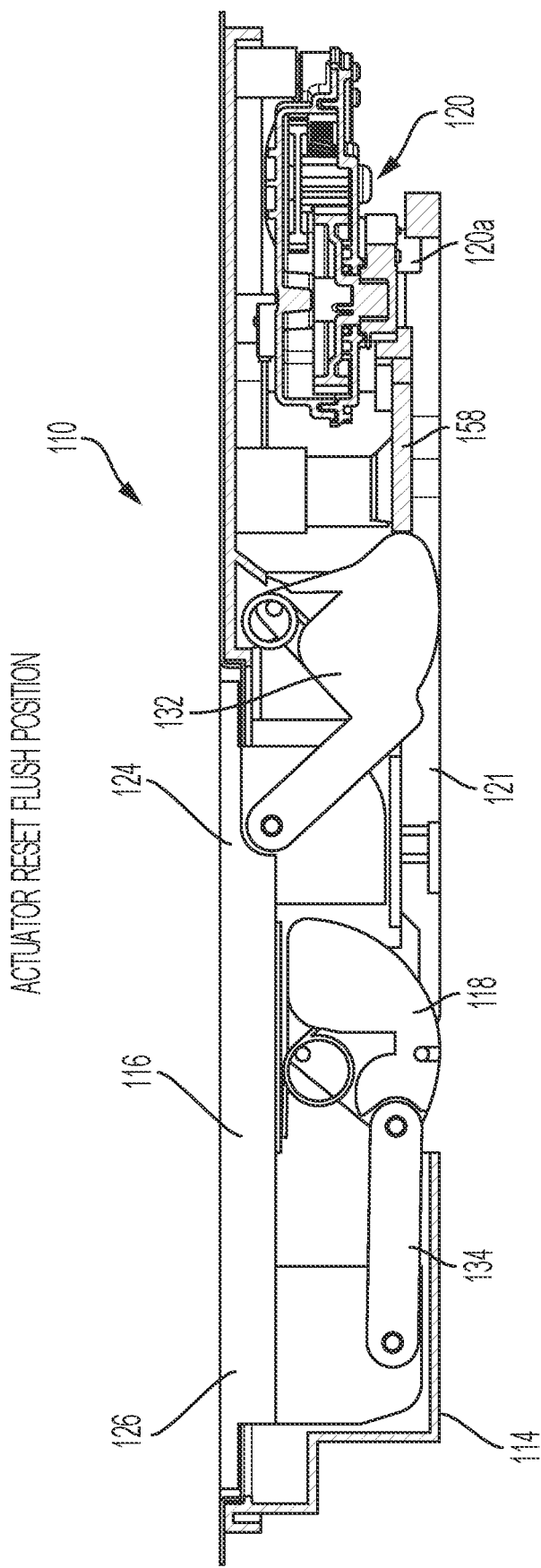
FIG. 36 is a side elevation and partial sectional view of the door handle assembly, shown in its actuator reset flush position.
Figure 37:
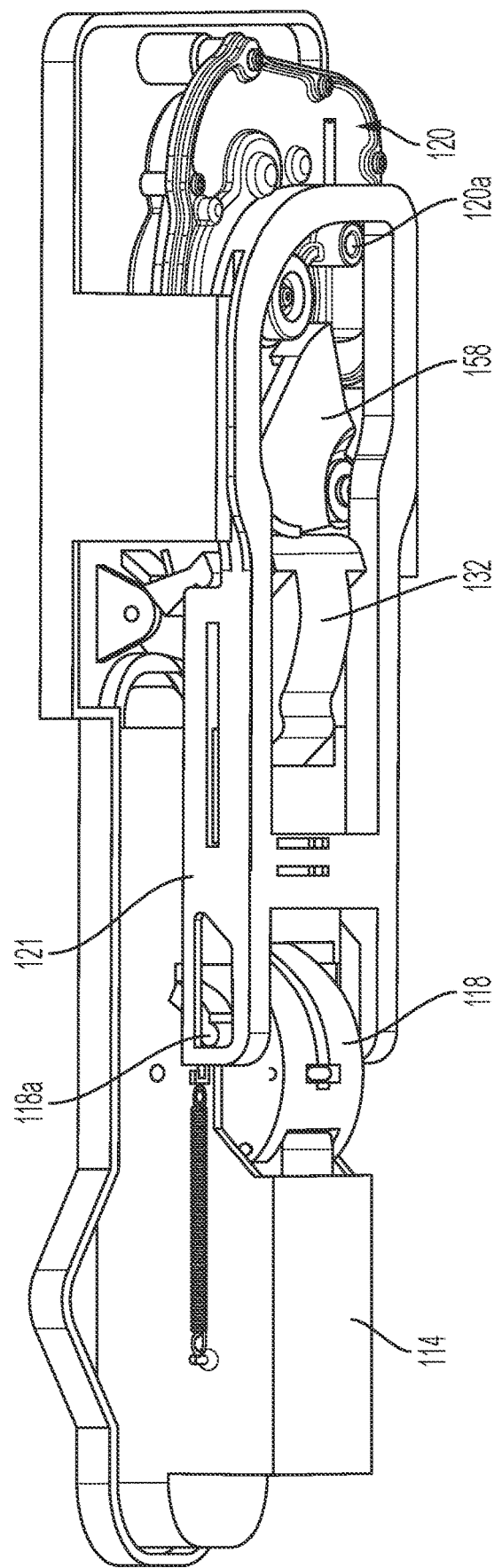
FIG. 37 is a perspective view of the door handle assembly of FIG. 36.

In such a situation, and such as can be seen with reference to FIGS. 34 and 35 (and as can be seen by comparing FIGS. 32 and 33 to FIGS. 36 and 37), the reset plate 121 is moved (via the actuator 120 rotating its actuating portion 120a to engage and move an end of the plate 121) to cause the handle to retract. The actuator pushes the reset plate and causes it to slide relative to the base or bracket. Moving the reset plate rotates the bellcrank 118 and the crank back 132 to their flush position, which resets the handle to the flush position. For example, the reset plate is moved by the actuating portion 120a so that the ends of the slots of the plate engage and move the pins 118a of the bellcrank 118, and so that a tab or element 121a of the reset plate engages a tab of the crank 134, which causes rotation of the bellcrank and the crank to retract the handle. Thus, the actuator and reset plate function to return the door handle to its flush or retracted state, such as shown in FIGS. 35-37.

Figure 38:
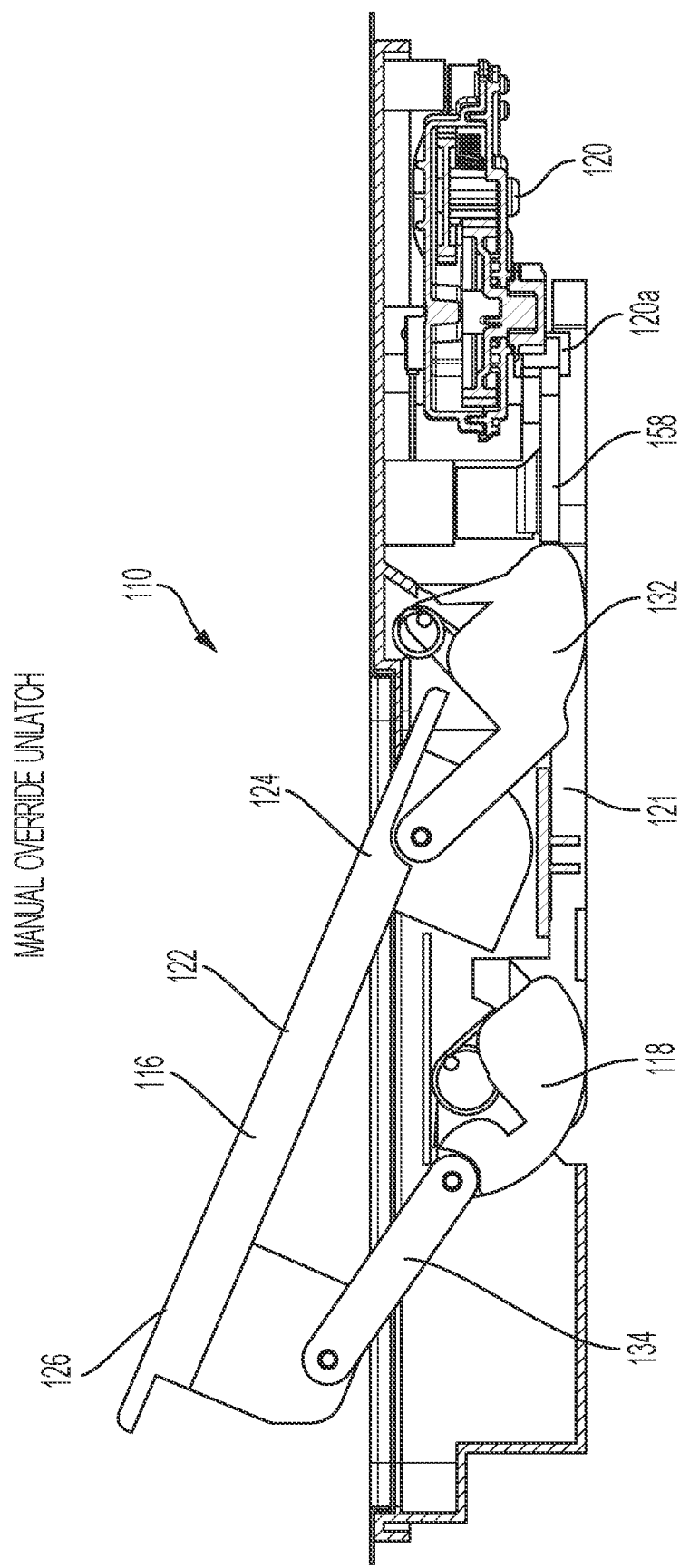
FIG. 38 is a side elevation and partial sectional view of the door handle assembly, shown in its manual override unlatch position.
Figure 39:
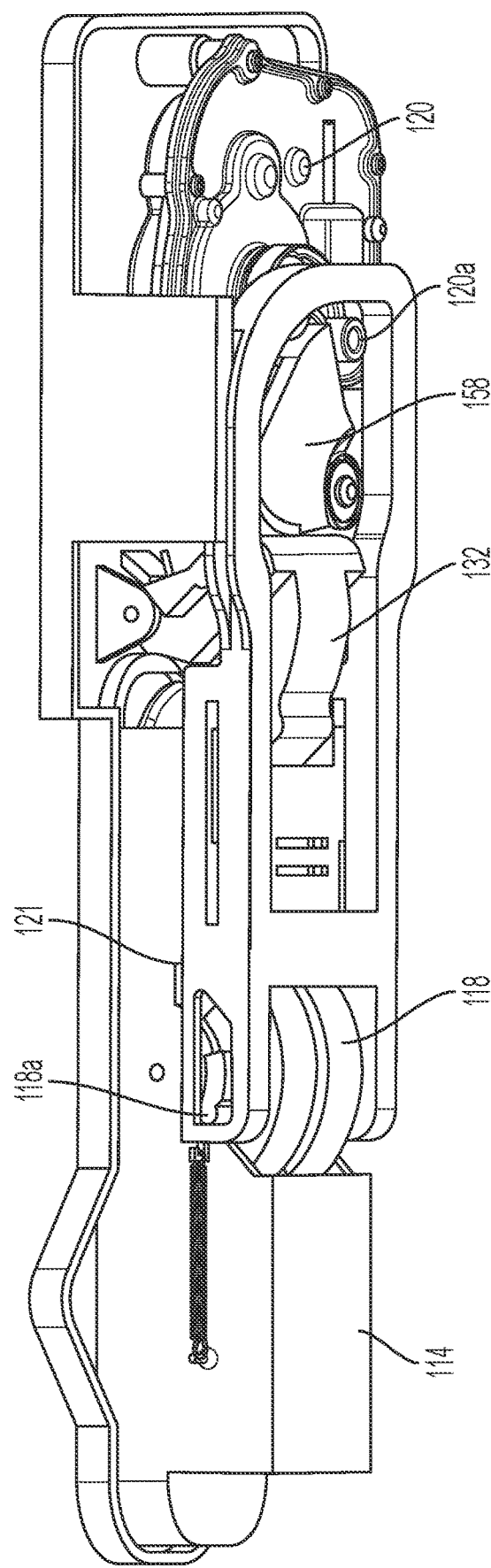
FIG. 39 is a perspective view of the door handle assembly of FIG. 38.

Additionally, the door handle assembly provides a manual override feature, which allows a user to open the vehicle door when the door handle is not extended. As shown in FIGS. 38 and 39, a user may pull the door handle to pivot the bellcrank 118 to open the vehicle door, without pivoting the crank 132. For example, the user may press inward at the end of the door handle by the crank until the opposite end of the door handle extends from the bracket a sufficient amount to allow the user to grasp the door handle and pull. The pulling of the door handle pivots the bellcrank to open the vehicle.

Therefore, the exterior door handle assembly for a door of a vehicle includes a base portion 114 disposed at a door handle region of a vehicle, and a handle portion 116 including a base end 124, a swing end 126, and a grasping portion 122 disposed between the base end and the swing end. The handle portion is movable relative to the base portion between a recessed position (FIG. 26), where the handle portion is recessed at the base portion so as to be not graspable by a user (and with an outer surface of the grasping portion of the handle portion being generally flush or co-planar with an outer surface of the door handle region at and around the handle portion), and a deployed position (FIG. 28), where the handle portion protrudes outward from the base portion to be graspable by the user. A crank 132 pivotally connects the base end 124 of the handle portion 116 to the base portion 114. A bellcrank 118 is pivotally mounted at the base portion and is coupled with a door latch of the door of the vehicle. A bellcrank link 134 pivotally connects the swing end 126 of the handle portion to the bellcrank 118.

The handle assembly comprises an actuator 120 including a motor that is electrically operable in response to an input signal. Responsive to the input signal, the motor operates and the actuator engages a portion of the crank (such as via a surface of an actuating cam 158 engaging a surface of the crank 132) to impart pivotal movement of the crank to cause the crank to pivot relative to the base portion and move the handle portion from the recessed position toward the deployed position. As the crank pivots to move the base end of the handle portion, the bellcrank link 134 pivots relative to bellcrank and the base portion to move the swing end of the handle portion relative to the base portion 114. When the handle portion is at the deployed position (FIG. 28), the swing end of the handle portion is manually movable further outward from the base portion to move the bellcrank link outward from the base portion to impart pivotal movement of the bellcrank relative to the base portion to open the door of the vehicle (see FIG. 30).

The door handle assembly includes a reset element that is operatively coupled with the actuator and the bellcrank. When the handle portion is deployed, actuation of the actuator in a direction opposite from the direction for deploying the handle portion moves the reset element to pivot the bellcrank and the crank in a retracting direction to retract the handle portion toward and to the recessed position.

The actuator, when the motor is operated, pivotally moves the actuator arm or actuating cam 158 that has a cam surface that engages the portion of the crank 132 to impart pivotal movement of the crank to move the base end of the handle portion toward the deployed position. Outward movement of the base end of the handle portion imparts outward movement of the swing end of the handle portion, such that the handle portion moves outward from the door while remaining parallel to the door of the vehicle. When the handle portion is at the deployed position, manual movement of the swing end of the handle portion to open the door of the vehicle moves the swing end relative to the base portion and pivots the bellcrank 118 via pulling action at the bellcrank link (that is pivotally attached to both the swing end of the handle portion and to the bellcrank). Pivotal movement of the bellcrank pulls at a cable or connecting link that connects the bellcrank to the latch mechanism of the vehicle door.

The door handle assembly thus provides a parallel door handle deployment, which is electrically actuated from a flush position or state to a deployed position or state. The door handle is spring-biased to return to its flush state after deployment (and after the actuator cam is rotated back to its initial position). The four bar linkage mechanism, with the follower attached directly to the counter weight/bellcrank, causes the follower and the bellcrank to both move when the handle is pulled to activate the latch or e-latch switch.

The same actuator that extends the handle is used to electrically reset the handle to its flush position if the handle is stuck open in any position. The reset plate is spring loaded to return to its normal state after the handle is reset to the flush position. However, in case the reset plate fails to return with just the spring load, the plate can be returned to its normal position by the user pulling the handle open manually (depending on the actuator position, the user may have to back drive the actuator; the actuator can be back-drivable or have a clutch mechanism built in series with the drive train). The plate can also be returned to its normal position by powering the actuator, which will push the reset plate back into its normal position.

The mechanism also allows the user to push on one side of the handle and open the handle. This will allow the user to unlatch the latch manually without using the actuator.

The actuator arm is used to change the mechanical advantage of the actuator to the handle at different handle positions. For example, at the flush state, the mechanical advantage is greater to increase the force on the handle required to stop the handle from opening, while at the deployed state, the mechanical advantage is reduced so the opening speed is increased. In order to prevent the handle from opening during side impacts, mass could be added to the bellcrank and/or the crank to resist outward movement of the handle when the actuator does not operate to extend or deploy the handle.

Thus, when normally mounted to a vehicle door and not in use, the door handle assembly of the present invention provides a generally flush mounted door handle that does not protrude from the side of the vehicle and/or does not have a pocket or recess thereat to facilitate grasping of the door handle by a person using the door handle to open the vehicle door. The actuator of the door handle assembly may cause the handle portion to extend from the vehicle when it is desired or appropriate for the user to grasp the door handle to open the vehicle door. Such movement of the door handle by the actuator may be in response to any suitable trigger or signal, such as in response to detection of a signal from a transmitting device or the like (such as a key fob or the like) that the user may carry, or such as in response to a detection of a proximity of a device that the user may carry (which is automatically detected when it is in a detectable distance from the vehicle and does not require that the user actuate a door unlock button or the like) or in response to other passive entry type systems and/or devices. Although shown and described as being movable by an electrically operable motor and actuator, the movement of the handle from its recessed position to its graspable position may be via any suitable means, such as an electric motor or a memory wire or muscle wire or the like.

By providing a flush or generally flush or recessed handle, the present invention reduces air drag and enhances the aerodynamic performance of the equipped vehicle with a potential for enhanced fuel economy for the vehicle. The extension of the handle from its recessed position to its partially extended or graspable position may be responsive to any suitable trigger or signal or the like. For example, the handle may extend to its graspable position responsive to a touch or proximity of a person's hand at the door handle or at the door or the like (such as via responsive to a touch or proximity sensor disposed at the vehicle door at or near the door handle). Optionally, the movement of the handle to its partially extended graspable position may be responsive to a signal received from a remote transmitting device, such as a key fob or identifying device or the like (and the signal may comprise a radio frequency signal or infrared signal or any suitable signaling means), or may be responsive to a human action at the door (such as a touch and/or proximity of a person or person's hand at the door or door handle).

Optionally, the movement of the door handle to its partially extended or graspable position may be done in conjunction with other functions, such as activation of one or more vehicle exterior lights (such as ground illumination lights or headlights or turn signal lights or the like) or such as activation of one or more vehicle interior lights or such as actuation of the vehicle horn or other signal to alert the user that the door handle is moved to its graspable position. Control circuitry or logic to provide the dual or multiple functions can piggyback on one common control system.

Optionally, the control circuitry or logic to control or extend the handle portion may include a lockout function so that the control will not and cannot extend the handle when it is not appropriate to open the door of the vehicle. For example, the lockout function may limit or preclude extension of the door handle when the vehicle is in a forward or reverse gear or when the vehicle ignition is on or following a period of time (such as about twenty seconds or more or less) after the vehicle ignition is turned on or when the vehicle is moving at or above a threshold speed (such as, for example, at or above about three mph or about five mph or other selected threshold vehicle speed) or the like. When one or more of these conditions (and optionally one or more other conditions depending on the particular application) is detected, the control limits or precludes extension of the handle to its graspable position irrespective of receipt of other inputs, such as a door unlock button actuation or a passive entry system signal or the like.

Optionally, the door handle assembly and/or the vehicle door may include a control or control module for operating and controlling the actuator (and/or other devices or functions of the door or vehicle). For example, the door or door handle assembly may include a control module that utilizes aspects of the control modules disclosed in U.S. Pat. Publication No. US-2010-0007463, which is hereby incorporated herein by reference in its entirety.

Although shown as a strap type handle, the handle assembly may comprise any suitable type of vehicle door handle assembly, such as a paddle type vehicle door handle assembly (having a paddle or handle portion that is pivotable about a generally horizontal pivot axis to open the vehicle door) and/or such as a handle assembly of the types described in U.S. Pat. Nos. 6,349,450; 6,550,103 and/or 6,907,643, which are hereby incorporated herein by reference in their entireties) or other type of vehicle door handle assembly, while remaining within the spirit and scope of the present invention. Optionally, the door handle assembly may include a soft touch handle portion, such as utilizing the principles described in U.S. Pat. Nos. 6,349,450; 6,550,103 and/or 6,907,643, incorporated above.

Optionally, the door handle assembly may include an antenna or the like, such as for sensing or transmitting signals, such as described in U.S. Pat. No. 6,977,619, which is hereby incorporated herein by reference in its entirety. For example, the handle assembly may include an antenna or sensor (such as an antenna and/or capacitive sensor) at the handle portion and/or may include a passive entry device or element. The antenna or sensor and/or passive entry device may receive a signal from a transmitting device (such as from a key fob or the like carried by the driver of the vehicle) and/or may sense or detect the presence of or proximity of a person or person's hand at or near the door handle, and may generate an output signal indicative of such detection. The actuator may be responsive to the antenna and/or sensor and/or device to impart an outward movement of the door handle portion so that the user can grasp the handle portion to open the door of the vehicle.

Optionally, the extendable flush door handle assembly of the present invention may provide an energy generating feature. For example, the handle can act as a generator to create energy for the use of powering emergency devices (such as, for example, an electric latch, lighting, and/or the like) on a vehicle when the vehicle battery is low in power. By using an actuator with a back drivable gear train, the user could cycle the handle manually and generate power by rotating a motor. Other power generation methods could include, but are not limited to, power savaging, induction coils, Piezo electric materials, a pre-charged capacitor, Peltier devices, and/or power transfer from external devices. The generated power can be stored in one or more batteries or capacitors disposed at the vehicle door or in the vehicle.

Optionally, the extendable flush door handle assembly of the present invention may provide one or more bumpers, which can be used to reduce the sound that the handle makes while returning to its closed or flush position. The bumpers can be placed to maintain the gap between the handle and the sheet metal of the vehicle door when the handle is in its flush position.

Although shown and described as being a generally horizontally oriented handle portion that pivots about a generally vertical pivot axis, it is envisioned that the handle of the extendable flush door handle assembly may be oriented in any manner while remaining within the spirit and scope of the present invention. For example, the handle may be oriented so that it is either vertical, horizontal, or diagonal with respect to the ground. Also, although shown and described as an exterior door handle for opening a side door or rear door or lift gate of a vehicle from exterior the vehicle, it is envisioned that the extendable flush door handle assembly may be suitable for use as an interior handle for opening a side door or rear door or liftgate of a vehicle from inside the vehicle, while remaining within the spirit and scope of the present invention.

Optionally, the door handle assembly or module may incorporate other features or accessories, such as, for example, a blind spot indicator device or element and/or a turn signal indicator device or element, such as by utilizing aspects of the devices described in U.S. Pat. Nos. 8,786,704; 8,058,977; 7,944,371; 7,492,281; 6,198,409; 5,929,786 and/or 5,786,772, which are hereby incorporated herein by reference in their entireties. The signal indicator or indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, and/or PCT Application No. PCT/US2006/018567, filed May 16, 2006 and published Nov. 23, 2006 as International Publication No. WO 2006/124682, which are hereby incorporated herein by reference in their entireties.

Optionally, the door handle assembly or module may include or may be associated with an antenna for receiving signals from or communicating with a remote device. For example, the antenna (such as, for example, an antenna of the types described in U.S. Pat. No. 6,977,619, which is hereby incorporated herein by reference in its entirety) may communicate a signal to the door locking system via a wire connection or the like, or wirelessly, such as via a radio frequency signal or via an infrared signal or via other wireless signaling means. Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 6,280,069; 6,276,821; 6,176,602; 6,152,590; 6,149,287; 6,139,172; 6,086,229; 5,938,321; 5,671,996; 5,497,305; 6,416,208 and/or 6,568,839, all of which are hereby incorporated herein by reference in their entireties), or the vehicle ignition, or any other desired system, while remaining within the spirit and scope of the present invention.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door handle assembly, the vehicular exterior door handle assembly comprising:
    a base portion configured to be disposed at a door handle region of a vehicle door;
    a handle portion including a base end and a swing end opposite the base end;
    wherein the handle portion is movable relative to the base portion between a retracted position, where the handle portion is at least partially recessed at the base portion, and a deployed position, where at least a portion of the of the handle portion protrudes outward from the base portion;

a crank pivotally disposed at the base portion and pivotally coupled with the base end of the handle portion, wherein the crank pivots relative to the base portion about a first pivot axis;

a bellcrank that is pivotally mounted at the base portion and that, with the base portion disposed at the door handle region of the vehicle door, is coupled with a door latch of the vehicle door;

a bellcrank connecting link that pivotally connects the swing end of the handle portion to the bellcrank;

an actuator including a motor that is electrically operable in response to an input signal from a signal transmitting device;

wherein the motor, when electrically operated in response to the input signal, pivots an output cam about a second pivot axis that is perpendicular to the first pivot axis;

wherein the motor is electrically operable in a deploying direction to move the handle portion toward the deployed position and is electrically operable in a retracting direction opposite the deploying direction;

wherein, responsive to the input signal, the motor electrically operates in the deploying direction and the output cam of the actuator pivots about the second pivot axis and imparts pivotal movement of the crank about the first pivot axis to move the handle portion toward the deployed position;

wherein, with the base portion disposed at the door handle region of the vehicle door, and with the handle portion at the deployed position, the swing end of the handle portion is manually movable further outward from the base portion to pivot the bellcrank and actuate the door latch of the vehicle door;

a reset element operatively coupled with the actuator;

wherein, with the handle portion at the deployed position, electrical operation of the motor of the actuator in the retracting direction imparts retracting movement of the reset element that causes the reset element to engage the bellcrank and the crank to pivot the bellcrank and the crank to retract the handle portion toward the retracted position;

wherein the reset element is translationally movable along the base portion; and wherein the reset element is biased in a direction opposite the direction of retracting movement.

2. The vehicular exterior door handle assembly of claim 1, wherein, with the base portion disposed at the door handle region of the vehicle door, the vehicular exterior door handle assembly is mounted at the door handle region of a side vehicle door.

3. The vehicular exterior door handle assembly of claim 1, wherein, with the base portion disposed at the door handle region of the vehicle door, the vehicular exterior door handle assembly is mounted at the door handle region of one selected from the group consisting of (a) a rear vehicle door and (b) a vehicle liftgate.

4. The vehicular exterior door handle assembly of claim 1, wherein the handle portion, when at the retracted position, is recessed in the base portion so as to be not graspable by a user until the handle portion is moved toward the deployed position.

5. The vehicular exterior door handle assembly of claim 1, wherein, when the handle portion is at the retracted position, the base end of the handle portion is manually movable inward into the base portion to cause the swing end of the handle portion to move outward from the base portion without electrical operation of the motor.

6. The vehicular exterior door handle assembly of claim 1, wherein the signal transmitting device comprises at least one selected from the group consisting of (a) a passive entry device, (b) a remote transmitting device, and (c) a door unlock button of the vehicle door.

7. The vehicular exterior door handle assembly of claim 1, wherein the actuator comprises an actuating portion that is pivotally driven when the motor is electrically operated, and wherein electrical operation of the motor of the actuator in the deploying direction pivots the actuating portion to engage the output cam to impart pivotal movement of the output cam to deploy the handle portion.

8. The vehicular exterior door handle assembly of claim 7, wherein, when the motor is electrically operated in the retracting direction, the actuating portion pivots away from the output cam and engages the reset element and imparts the retracting movement of the reset element.

9. The vehicular exterior door handle assembly of claim 1, wherein an actuator arm of the output cam has a cam surface that engages the crank and that, when the motor is electrically operated to pivot the output cam, imparts pivotal movement of the crank and the base end of the handle portion toward the deployed position.

10. The vehicular exterior door handle assembly of claim 9, wherein the actuator comprises an actuating portion that is pivotally driven when the motor is electrically operated, and wherein electrical operation of the motor of the actuator in the deploying direction pivots the actuating portion to engage the output cam to impart pivotal movement of the output cam to deploy the handle portion.

11. The vehicular exterior door handle assembly of claim 1, wherein pivotal movement of the crank imparts outward movement of the base end of the handle portion such that the handle portion moves outward from the door handle region while remaining parallel to the door handle region of the vehicle door.

12. The vehicular exterior door handle assembly of claim 1, wherein, with the handle portion at the deployed position, manual movement of the swing end of the handle portion to pivot the bellcrank and actuate the door latch moves the swing end relative to the base portion and pivots the handle portion at the crank.

13. A vehicular exterior door handle assembly, the vehicular exterior door handle assembly comprising:

a base portion configured to be disposed at a door handle region of a vehicle door;

a handle portion including a base end and a swing end opposite the base end;

wherein the handle portion is movable relative to the base portion between a retracted position, where the handle portion is at least partially recessed at the base portion, and a deployed position, where at least a portion of the of the handle portion protrudes outward from the base portion;

a crank pivotally disposed at the base portion and pivotally coupled with the base end of the handle portion, wherein the crank pivots relative to the base portion about a first pivot axis;

a bellcrank that is pivotally mounted at the base portion and that, with the base portion disposed at the door handle region of the vehicle door, is coupled with a door latch of the vehicle door;

a bellcrank connecting link that pivotally connects the swing end of the handle portion to the bellcrank;

an actuator including a motor that is electrically operable in response to an input signal from a signal transmitting device;

wherein the motor, when electrically operated in response to the input signal, pivots an output cam about a second pivot axis that is perpendicular to the first pivot axis;

wherein the motor is electrically operable in a deploying direction to move the handle portion toward the deployed position and is electrically operable in a retracting direction opposite the deploying direction;

wherein, responsive to the input signal, the motor electrically operates in the deploying direction and the output cam of the actuator pivots about the second pivot axis and imparts pivotal movement of the crank about the first pivot axis to move the handle portion toward the deployed position;

wherein, with the base portion disposed at the door handle region of the vehicle door, and with the handle portion at the deployed position, the swing end of the handle portion is manually movable further outward from the base portion to pivot the bellcrank and actuate the door latch of the vehicle door;

a reset element operatively coupled with the actuator;

wherein, with the handle portion at the deployed position, electrical operation of the motor of the actuator in the retracting direction imparts retracting movement of the reset element that causes the reset element to engage the bellcrank and the crank to pivot the bellcrank and the crank to retract the handle portion toward the retracted position; and wherein the reset element moves to pivot the bellcrank and the crank to move the handle portion toward the retracted position when the handle portion remains at the deployed position after the swing end of the handle portion is manually moved further outward from the base portion to pivot the bellcrank and actuate the door latch of the vehicle door and released.

14. A vehicular exterior door handle assembly, the vehicular exterior door handle assembly comprising:

a base portion configured to be disposed at a door handle region of a vehicle door;

a handle portion including a base end and a swing end opposite the base end;

wherein the handle portion is movable relative to the base portion between a retracted position, where the handle portion is at least partially recessed at the base portion, and a deployed position, where at least a portion of the of the handle portion protrudes outward from the base portion;

a crank pivotally disposed at the base portion and pivotally coupled with the base end of the handle portion, wherein the crank pivots relative to the base portion about a first pivot axis;

a bellcrank that is pivotally mounted at the base portion and that, with the base portion disposed at the door handle region of the vehicle door, is coupled with a door latch of the vehicle door;

a bellcrank connecting link that pivotally connects the swing end of the handle portion to the bellcrank;

an actuator including a motor that is electrically operable in response to an input signal from a signal transmitting device;

wherein the motor, when electrically operated in response to the input signal, pivots an output cam about a second pivot axis that is perpendicular to the first pivot axis;

wherein the motor is electrically operable in a deploying direction to move the handle portion toward the deployed position and is electrically operable in a retracting direction opposite the deploying direction;

wherein, responsive to the input signal, the motor electrically operates in the deploying direction and the output cam of the actuator pivots about the second pivot axis and imparts pivotal movement of the crank about the first pivot axis to move the handle portion toward the deployed position;

wherein, with the base portion disposed at the door handle region of the vehicle door, and with the handle portion at the deployed position, the swing end of the handle portion is manually movable further outward from the base portion to pivot the bellcrank and actuate the door latch of the vehicle door;

a reset element operatively coupled with the actuator;

wherein, with the handle portion at the deployed position, electrical operation of the motor of the actuator in the retracting direction imparts retracting movement of the reset element that causes the reset element to engage the bellcrank and the crank to pivot the bellcrank and the crank to retract the handle portion toward the retracted position;

wherein an actuator arm of the output cam has a cam surface that engages the crank and that, when the motor is electrically operated to pivot the output cam, imparts pivotal movement of the crank and the base end of the handle portion toward the deployed position;

wherein the actuator comprises an actuating portion that is pivotally driven when the motor is electrically operated, and wherein electrical operation of the motor of the actuator in the deploying direction pivots the actuating portion to engage the output cam to impart pivotal movement of the output cam to deploy the handle portion; and wherein, when the motor is electrically operated in the retracting direction, the actuating portion pivots away from the output cam and engages the reset element and imparts the retracting movement of the reset element.

15. A vehicular exterior door handle assembly, the vehicular exterior door handle assembly comprising:

a base portion configured to be disposed at a door handle region of a vehicle door;

a handle portion including a base end and a swing end opposite the base end;

wherein the handle portion is movable relative to the base portion between a retracted position, where the handle portion is at least partially recessed at the base portion, and a deployed position, where at least a portion of the of the handle portion protrudes outward from the base portion;

a crank pivotally disposed at the base portion and pivotally coupled with the base end of the handle portion, wherein the crank pivots relative to the base portion about a first pivot axis;

a bellcrank that is pivotally mounted at the base portion and that, with the base portion disposed at the door handle region of the vehicle door, is coupled with a door latch of the vehicle door;

wherein the swing end of the handle portion is pivotally connected to the bellcrank;

an actuator including a motor that is electrically operable in response to an input signal from a signal transmitting device;

wherein the motor, when electrically operated in response to the input signal, rotatably drives an actuating portion that engages and pivots an output cam about a second pivot axis that is perpendicular to the first pivot axis;

wherein the motor is electrically operable in a deploying direction to move the handle portion toward the deployed position and is electrically operable in a retracting direction opposite the deploying direction;

wherein, responsive to the input signal, the motor electrically operates in the deploying direction and pivots the output cam about the second pivot axis and imparts pivotal movement of the crank about the first pivot axis to move the handle portion toward the deployed position;

wherein, with the base portion disposed at the door handle region of the vehicle door, and with the handle portion at the deployed position, the swing end of the handle portion is manually movable further outward from the base portion to pivot the bellcrank and actuate the door latch of the vehicle door;

a reset element operatively coupled with the actuator and translationally movable along the base portion;

wherein, with the handle portion at the deployed position, electrical operation of the motor of the actuator in the retracting direction rotates the actuating portion to engage the reset element and impart retracting movement of the reset element that causes the reset element to at least one selected from the group consisting of (i) engage the bellcrank to pivot the bellcrank to retract the handle portion toward the retracted position and (ii) engage the crank to pivot the crank to retract the handle portion toward the retracted position; and wherein the reset element is biased in a direction opposite the direction of retracting movement.

16. The vehicular exterior door handle assembly of claim 15, wherein, with the base portion disposed at the door handle region of the vehicle door, the vehicular exterior door handle assembly is mounted at the door handle region of a side vehicle door.

17. A vehicular exterior door handle assembly, the vehicular exterior door handle assembly comprising:

a base portion configured to be disposed at a door handle region of a vehicle door;

a handle portion including a base end and a swing end opposite the base end;

wherein the handle portion is movable relative to the base portion between a retracted position, where the handle portion is at least partially recessed at the base portion, and a deployed position, where at least a portion of the of the handle portion protrudes outward from the base portion;

a crank pivotally disposed at the base portion and pivotally coupled with the base end of the handle portion, wherein the crank pivots relative to the base portion about a first pivot axis;

a bellcrank that is pivotally mounted at the base portion and that, with the base portion disposed at the door handle region of the vehicle door, is coupled with a door latch of the vehicle door;

wherein the swing end of the handle portion is pivotally connected to the bellcrank;

an actuator including a motor that is electrically operable in response to an input signal from a signal transmitting device;

wherein the motor, when electrically operated in response to the input signal, rotatably drives an actuating portion that engages and pivots an output cam about a second pivot axis that is perpendicular to the first pivot axis;

wherein the motor is electrically operable in a deploying direction to move the handle portion toward the deployed position and is electrically operable in a retracting direction opposite the deploying direction;

wherein, responsive to the input signal, the motor electrically operates in the deploying direction and pivots the output cam about the second pivot axis and imparts pivotal movement of the crank about the first pivot axis to move the handle portion toward the deployed position;

wherein, with the base portion disposed at the door handle region of the vehicle door, and with the handle portion at the deployed position, the swing end of the handle portion is manually movable further outward from the base portion to pivot the bellcrank and actuate the door latch of the vehicle door;

a reset element operatively coupled with the actuator and translationally movable along the base portion;

wherein, with the handle portion at the deployed position, electrical operation of the motor of the actuator in the retracting direction rotates the actuating portion to engage the reset element and impart retracting movement of the reset element that causes the reset element to at least one selected from the group consisting of (i) engage the bellcrank to pivot the bellcrank to retract the handle portion toward the retracted position and (ii) engage the crank to pivot the crank to retract the handle portion toward the retracted position; and wherein the reset element moves to pivot the bellcrank and the crank to move the handle portion toward the retracted position when the handle portion remains at the deployed position after the swing end of the handle portion is manually moved further outward from the base portion to pivot the bellcrank and actuate the door latch of the vehicle door and released.

18. The vehicular exterior door handle assembly of claim 15, wherein the output cam has a cam surface that engages the crank and that, when the motor is electrically operated to rotatably drive the actuating portion to pivot the output cam, imparts pivotal movement of the crank and the base end of the handle portion toward the deployed position.

19. The vehicular exterior door handle assembly of claim 15, wherein pivotal movement of the crank imparts outward movement of the base end of the handle portion such that the handle portion moves outward from the door handle region while remaining parallel to the door handle region of the vehicle door.

20. A vehicular exterior door handle assembly, the vehicular exterior door handle assembly comprising:

a base portion configured to be disposed at a door handle region of a vehicle door;

a handle portion including a base end and a swing end opposite the base end;

wherein the handle portion is movable relative to the base portion between a retracted position, where the handle portion is at least partially recessed at the base portion, and a deployed position, where at least a portion of the of the handle portion protrudes outward from the base portion;

a crank pivotally disposed at the base portion and pivotally coupled with the base end of the handle portion;

a bellcrank that is pivotally mounted at the base portion and that, with the base portion disposed at the door handle region of the vehicle door, is coupled with a door latch of the vehicle door;

wherein the swing end of the handle portion is pivotally connected to the bellcrank;

an actuator including a motor that is electrically operable to drive an output element;

wherein the motor is electrically operable in a deploying direction to move the handle portion toward the deployed position and is electrically operable in a retracting direction opposite the deploying direction;

wherein, with the handle portion at the retracted position, electrical operation of the motor in the deploying direction drives the output element and imparts pivotal movement of the connecting link crank to move the handle portion toward the deployed position;

a reset element operatively coupled with the actuator;

wherein, with the base portion disposed at the door handle region of the vehicle door, and with the handle portion at the deployed position, the swing end of the handle portion is manually movable further outward from the base portion to pivot the bellcrank and actuate the door latch of the vehicle door;

wherein, when the handle portion remains at the deployed position after the swing end of the handle portion is manually moved further outward from the base portion and released, electrical operation of the motor of the actuator in the retracting direction imparts retracting movement of the reset element that causes the reset element to at least one selected from the group consisting of (i) engage the bellcrank to pivot the bellcrank to retract the handle portion toward the retracted position and (ii) engage the crank to pivot the crank to retract the handle portion toward the retracted position; and wherein the reset element is biased in a direction opposite the direction of retracting movement.

21. The vehicular exterior door handle assembly of claim 20, wherein the reset element is translationally movable along the base portion.

22. The vehicular exterior door handle assembly of claim 20, wherein the actuator pivotally drives the output element when the motor is electrically operated, and wherein electrical operation of the motor of the actuator in the deploying direction pivots the output element to engage an output cam to impart pivotal movement of the output cam to deploy the handle portion.

23. The vehicular exterior door handle assembly of claim 20, wherein pivotal movement of the crank imparts outward movement of the base end of the handle portion such that the handle portion moves outward from the door handle region while remaining parallel to the door handle region of the vehicle door.

24. The vehicular exterior door handle assembly of claim 20, wherein the crank pivots relative to the base portion about a first pivot axis, and wherein the motor is electrically operable to pivotally drive the output element about a second pivot axis that is perpendicular to the first pivot axis.

25. A vehicular exterior door handle assembly, the vehicular exterior door handle assembly comprising:

a base portion configured to be disposed at a door handle region of a vehicle door;

a handle portion including a base end and a swing end opposite the base end;

wherein the handle portion is movable relative to the base portion between a retracted position, where the handle portion is at least partially recessed at the base portion, and a deployed position, where at least a portion of the of the handle portion protrudes outward from the base portion;

a crank pivotally disposed at the base portion and pivotally coupled with the base end of the handle portion;

a bellcrank that is pivotally mounted at the base portion and that, with the base portion disposed at the door handle region of the vehicle door, is coupled with a door latch of the vehicle door;

wherein the swing end of the handle portion is pivotally connected to the bellcrank;

an actuator including a motor that is electrically operable to drive an output element;

wherein the motor is electrically operable in a deploying direction to move the handle portion toward the deployed position and is electrically operable in a retracting direction opposite the deploying direction;

wherein, with the handle portion at the retracted position, electrical operation of the motor in the deploying direction drives the output element and imparts pivotal movement of the crank to move the handle portion toward the deployed position;

a reset element operatively coupled with the actuator;

wherein, with the base portion disposed at the door handle region of the vehicle door, and with the handle portion at the deployed position, the swing end of the handle portion is manually movable further outward from the base portion to pivot the bellcrank and actuate the door latch of the vehicle door;

wherein, when the handle portion remains at the deployed position after the swing end of the handle portion is manually moved further outward from the base portion and released, electrical operation of the motor of the actuator in the retracting direction imparts retracting movement of the reset element that causes the reset element to at least one selected from the group consisting of (i) engage the bellcrank to pivot the bellcrank to retract the handle portion toward the retracted position and (ii) engage the crank to pivot the crank to retract the handle portion toward the retracted position;

wherein the actuator pivotally drives the output element when the motor is electrically operated, and wherein electrical operation of the motor of the actuator in the deploying direction pivots the output element to engage an output cam to impart pivotal movement of the output cam to deploy the handle portion; and wherein, when the motor is electrically operated in the retracting direction, the output element pivots away from the output cam and engages the reset element and imparts the retracting movement of the reset element.

* * * * *

UNITED STATES PATENT AND TRADEMARK OFFICE
CERTIFICATE OF CORRECTION

| | | |
|---|---|---|
| PATENT NO. | : 12,503,891 B2 | Page 1 of 1 |
| APPLICATION NO. | : 18/336078 | |
| DATED | : December 23, 2025 | |
| INVENTOR(S) | : Justin E. Sobecki | |

It is certified that error appears in the above-identified patent and that said Letters Patent is hereby corrected as shown below:

In the Claims

Column 23
Claim 20, Line 6, "connecting link crank" should be --crank--

Signed and Sealed this
Twenty-seventh Day of January, 2026

John A. Squires
*Director of the United States Patent and Trademark Office*